(12) United States Patent
Black et al.

(10) Patent No.: US 10,706,743 B2
(45) Date of Patent: *Jul. 7, 2020

(54) SIMULATED DISSECTIBLE TISSUE

(71) Applicant: Applied Medical Resources Corporation, Rancho Santa Margarita, CA (US)

(72) Inventors: Katie Black, Rancho Santa Margarita, CA (US); Natasha Felsinger, Rancho Santa Margarita, CA (US); Tracy Breslin, Rancho Santa Margarita, CA (US); Gregory K. Hofstetter, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 587 days.

This patent is subject to a terminal disclaimer.

(21) Appl. No.: 15/355,155

(22) Filed: Nov. 18, 2016

(65) Prior Publication Data
US 2017/0148356 A1    May 25, 2017

Related U.S. Application Data

(60) Provisional application No. 62/257,847, filed on Nov. 20, 2015, provisional application No. 62/258,710, filed on Nov. 23, 2015.

(51) Int. Cl.
*G09B 23/30* (2006.01)
*G09B 23/28* (2006.01)
*G09B 23/34* (2006.01)

(52) U.S. Cl.
CPC ........... *G09B 23/30* (2013.01); *G09B 23/285* (2013.01); *G09B 23/34* (2013.01)

(58) Field of Classification Search
CPC ..................................................... G09B 23/30
(Continued)

(56) References Cited

U.S. PATENT DOCUMENTS

| 184,573 A | 11/1876 | Becker |
| 2,127,774 A | 8/1938 | Jacobs |

(Continued)

FOREIGN PATENT DOCUMENTS

| CN | 2421706 Y | 2/2001 |
| CN | 2751372 Y | 1/2006 |

(Continued)

OTHER PUBLICATIONS

The International Bureau of WIPO, International Preliminary Report on Patentability for International Application No. PCT/US2016/018697, entitled "Simulated Tissue Structures and Methods," dated Aug. 31, 2017, 14 pgs.

(Continued)

*Primary Examiner* — John E Simms, Jr.
*Assistant Examiner* — Dolores R Collins
(74) *Attorney, Agent, or Firm* — Shirin Bozorgui; Patrick Ikehara

(57) ABSTRACT

A simulated dissectible tissue model for practicing surgical skills is provided. The simulated tissue comprises a simulated anatomical structure, such as one or more artificial vessel, embedded with a silicone gel layer between two silicone layers. The simulated dissectible tissue, with or without a simulated anatomical structure, is connected to one or more artificial organ via a fiberfill layer. The fiberfill layer includes a plurality of entangled fibers embedded between two adjacent silicone layers. The fiberfill layer creates a dissection plane that permits the one or more artificial organ to be removed by spreading apart and selec- (Continued)

tively dissecting the chains of entangled fibers. Artificial nerves may be included in fiberfill layer.

14 Claims, 18 Drawing Sheets

(58) Field of Classification Search
USPC .......................................................... 434/272
See application file for complete search history.

(56) References Cited

U.S. PATENT DOCUMENTS

| | | | |
|---|---|---|---|
| 2,284,888 A | 6/1942 | Arneil, Jr. | |
| 2,324,702 A | 7/1943 | Hoffman et al. | |
| 2,345,489 A | 3/1944 | Lord | |
| 2,495,568 A | 1/1950 | Coel | |
| 3,766,666 A | 10/1973 | Stroop | |
| 3,775,865 A | 12/1973 | Rowan | |
| 3,789,518 A | 2/1974 | Chase | |
| 3,921,311 A | 11/1975 | Beasley et al. | |
| 3,991,490 A | 11/1976 | Markman | |
| 4,001,951 A | 1/1977 | Fasse | |
| 4,001,952 A | 1/1977 | Kleppinger | |
| 4,321,047 A | 3/1982 | Landis | |
| 4,323,350 A | 4/1982 | Bowden, Jr. | |
| 4,332,569 A | 6/1982 | Burbank | |
| 4,371,345 A | 2/1983 | Palmer et al. | |
| 4,386,917 A | 6/1983 | Forrest | |
| 4,459,113 A | 7/1984 | Boscaro Gatti et al. | |
| 4,481,001 A | 11/1984 | Graham et al. | |
| 4,596,528 A | 6/1986 | Lewis et al. | |
| 4,633,875 A * | 1/1987 | Turner | A61N 5/04 607/76 |
| 4,726,772 A | 2/1988 | Amplatz | |
| 4,737,109 A | 4/1988 | Abramson | |
| 4,789,340 A * | 12/1988 | Zikria | G09B 23/28 434/262 |
| 4,832,978 A | 5/1989 | Lesser | |
| 4,867,686 A | 9/1989 | Goldstein | |
| 4,907,973 A | 3/1990 | Hon | |
| 4,938,696 A | 7/1990 | Foster et al. | |
| 4,940,412 A | 7/1990 | Blumenthal | |
| 5,053,341 A * | 10/1991 | Companion | A61K 47/42 252/962 |
| 5,061,187 A | 10/1991 | Jerath | |
| 5,083,962 A | 1/1992 | Pracas | |
| 5,104,328 A | 4/1992 | Lounsbury | |
| 5,149,270 A | 9/1992 | McKeown | |
| 5,180,308 A | 1/1993 | Garito et al. | |
| 5,230,630 A | 7/1993 | Burgett | |
| 5,273,435 A | 12/1993 | Jacobson | |
| 5,295,694 A | 3/1994 | Levin | |
| 5,310,348 A | 5/1994 | Miller | |
| 5,318,448 A | 6/1994 | Garito et al. | |
| 5,320,537 A | 6/1994 | Watson | |
| 5,358,408 A | 10/1994 | Medina | |
| 5,368,487 A | 11/1994 | Medina | |
| 5,380,207 A | 1/1995 | Siepser | |
| 5,403,191 A | 4/1995 | Tuason | |
| 5,425,644 A | 6/1995 | Szinicz | |
| 5,425,731 A | 6/1995 | Daniel et al. | |
| 5,472,345 A | 12/1995 | Eggert | |
| 5,518,406 A | 5/1996 | Waters | |
| 5,518,407 A | 5/1996 | Greenfield et al. | |
| 5,520,633 A | 5/1996 | Costin | |
| 5,541,304 A | 7/1996 | Thompson | |
| 5,620,326 A | 4/1997 | Younker | |
| 5,720,742 A | 2/1998 | Zacharias | |
| 5,722,836 A | 3/1998 | Younker | |
| 5,727,948 A | 3/1998 | Jordan | |
| 5,743,730 A | 4/1998 | Clester et al. | |
| 5,762,458 A | 6/1998 | Wang et al. | |
| 5,769,640 A | 6/1998 | Jacobus et al. | |
| 5,775,916 A | 7/1998 | Cooper et al. | |
| 5,785,531 A | 7/1998 | Leung | |
| 5,800,178 A | 9/1998 | Gillio | |
| 5,803,746 A | 9/1998 | Barrie et al. | |
| 5,807,378 A | 9/1998 | Jensen et al. | |
| 5,810,880 A | 9/1998 | Jensen et al. | |
| 5,814,038 A | 9/1998 | Jensen et al. | |
| 5,850,033 A | 12/1998 | Mirzeabasov et al. | |
| 5,855,583 A | 1/1999 | Wang et al. | |
| 5,873,732 A | 2/1999 | Hasson | |
| 5,873,863 A | 2/1999 | Komlosi | |
| 5,908,302 A | 6/1999 | Goldfarb | |
| 5,947,743 A | 9/1999 | Hasson | |
| 5,951,301 A | 9/1999 | Younker | |
| 6,080,181 A | 6/2000 | Jensen et al. | |
| 6,083,008 A | 7/2000 | Yamada et al. | |
| 6,113,395 A | 9/2000 | Hon | |
| 6,234,804 B1 | 5/2001 | Yong | |
| 6,264,609 B1 * | 7/2001 | Herrington | A61B 5/02007 600/443 |
| 6,271,278 B1 | 8/2001 | Park et al. | |
| 6,336,812 B1 | 1/2002 | Cooper et al. | |
| 6,398,557 B1 | 6/2002 | Hoballah | |
| 6,413,264 B1 | 7/2002 | Jensen et al. | |
| 6,474,993 B1 | 11/2002 | Grund et al. | |
| 6,485,308 B1 | 11/2002 | Goldstein | |
| 6,488,507 B1 | 12/2002 | Stoloff et al. | |
| 6,497,902 B1 | 12/2002 | Ma | |
| 6,511,325 B1 | 1/2003 | Lalka et al. | |
| 6,517,354 B1 | 2/2003 | Levy | |
| 6,568,941 B1 | 5/2003 | Goldstein | |
| 6,589,057 B1 | 7/2003 | Keenan et al. | |
| 6,620,174 B2 | 9/2003 | Jensen et al. | |
| 6,654,000 B2 | 11/2003 | Rosenberg | |
| 6,659,776 B1 | 12/2003 | Aumann et al. | |
| 6,773,263 B2 | 8/2004 | Nicholls et al. | |
| 6,780,016 B1 * | 8/2004 | Toly | G09B 23/285 434/262 |
| 6,817,973 B2 | 11/2004 | Merril et al. | |
| 6,820,025 B2 | 11/2004 | Bachmann et al. | |
| 6,854,976 B1 | 2/2005 | Suhr | |
| 6,857,878 B1 | 2/2005 | Chosack et al. | |
| 6,863,536 B1 | 3/2005 | Fisher et al. | |
| 6,866,514 B2 | 3/2005 | Von Roeschlaub et al. | |
| 6,887,082 B2 | 5/2005 | Shun | |
| 6,929,481 B1 | 8/2005 | Alexander et al. | |
| 6,939,138 B2 | 9/2005 | Chosack et al. | |
| 6,950,025 B1 | 9/2005 | Nguyen | |
| 6,960,617 B2 | 11/2005 | Omidian et al. | |
| 6,997,719 B2 | 2/2006 | Wellman et al. | |
| 7,008,232 B2 | 3/2006 | Brassel | |
| 7,018,327 B1 | 3/2006 | Conti | |
| 7,025,064 B2 | 4/2006 | Wang et al. | |
| 7,056,123 B2 | 6/2006 | Gregorio et al. | |
| 7,080,984 B1 | 7/2006 | Cohen | |
| 7,118,582 B1 | 10/2006 | Wang et al. | |
| 7,255,565 B2 | 8/2007 | Keegan | |
| 7,269,532 B2 | 9/2007 | David et al. | |
| 7,272,766 B2 * | 9/2007 | Sakezles | G09B 2/30 434/262 |
| 7,300,450 B2 | 11/2007 | Vleugels et al. | |
| 7,364,582 B2 | 4/2008 | Lee | |
| 7,404,716 B2 | 7/2008 | Gregorio et al. | |
| 7,419,376 B2 | 9/2008 | Sarvazyan et al. | |
| 7,427,199 B2 | 9/2008 | Sakezles | |
| 7,431,189 B2 | 10/2008 | Shelton, IV et al. | |
| 7,441,684 B2 | 10/2008 | Shelton, IV et al. | |
| 7,465,168 B2 | 12/2008 | Allen et al. | |
| 7,467,075 B2 | 12/2008 | Humphries et al. | |
| 7,544,062 B1 | 6/2009 | Hauschild et al. | |
| 7,549,866 B2 | 6/2009 | Cohen et al. | |
| 7,553,159 B1 | 6/2009 | Arnal et al. | |
| 7,575,434 B2 | 8/2009 | Palakodeti | |
| 7,594,815 B2 | 9/2009 | Toly | |
| 7,621,749 B2 | 11/2009 | Munday | |
| 7,646,901 B2 | 1/2010 | Murphy et al. | |
| 7,648,367 B1 | 1/2010 | Makower et al. | |
| 7,648,513 B2 | 1/2010 | Green et al. | |
| 7,651,332 B2 | 1/2010 | Dupuis et al. | |
| 7,677,897 B2 | 3/2010 | Sakezles | |
| 7,775,916 B1 | 8/2010 | Mahoney | |

(56) References Cited

U.S. PATENT DOCUMENTS

| | | |
|---|---|---|
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 * | 12/2010 | Toly ...................... G09B 23/28 434/262 |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,017,107 B2 | 9/2011 | Thomas et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,465,771 B2 | 6/2013 | Wan et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 * | 12/2013 | Hendrickson ........ G09B 23/303 434/267 |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,096,744 B2 | 8/2015 | Wan et al. |
| 9,117,377 B2 | 8/2015 | Shim et al. |
| 9,119,572 B2 | 9/2015 | Gorek et al. |
| 9,123,261 B2 * | 9/2015 | Lowe ...................... G09B 23/30 |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,387,276 B2 | 7/2016 | Sun et al. |
| 9,427,496 B2 | 8/2016 | Sun et al. |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0126746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0147656 A1 * | 7/2005 | McCarthy ......... A61F 13/00034 424/445 |
| 2005/0192595 A1 | 9/2005 | Green et al. |
| 2005/0196739 A1 | 9/2005 | Moriyama |
| 2005/0196740 A1 | 9/2005 | Moriyama |
| 2005/0214727 A1 | 9/2005 | Stoianovici et al. |
| 2006/0046235 A1 | 3/2006 | Alexander et al. |
| 2006/0252019 A1 | 11/2006 | Burkitt et al. |
| 2006/0275741 A1 | 12/2006 | Chewning et al. |
| 2007/0066917 A1 * | 3/2007 | Hodorek ................ A61B 90/36 600/595 |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |

(56) References Cited

U.S. PATENT DOCUMENTS

| | | |
|---|---|---|
| 2007/0275359 A1 | 11/2007 | Rotnes et al. |
| 2008/0032272 A1 | 2/2008 | Palakodeti |
| 2008/0032273 A1 | 2/2008 | MacNamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2008/0317818 A1 | 12/2008 | Griffith et al. |
| 2009/0048684 A1* | 2/2009 | Lesh ................ A61F 2/0059 623/23.72 |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0248200 A1 | 9/2010 | Ladak |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0285094 A1 | 11/2010 | Gupta |
| 2010/0311025 A1* | 12/2010 | Everett ................ C08L 89/04 434/262 |
| 2010/0324541 A1 | 12/2010 | Whitman |
| 2011/0020779 A1 | 1/2011 | Hannaford et al. |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Bette et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Okano et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1* | 4/2013 | Hoke .................... G09B 23/34 434/267 |
| 2013/0105552 A1 | 5/2013 | Weir et al. |
| 2013/0116668 A1 | 5/2013 | Shelton, IV et al. |
| 2013/0157240 A1* | 6/2013 | Hart ...................... G09B 23/30 434/267 |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1* | 1/2014 | Lowe .................... G09B 23/30 434/273 |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087344 A1* | 3/2014 | Mavroudis ........... G09B 23/306 434/272 |
| 2014/0087345 A1 | 3/2014 | Breslin et al. |
| 2014/0087346 A1 | 3/2014 | Breslin et al. |
| 2014/0087347 A1* | 3/2014 | Tracy .................... G09B 23/30 434/272 |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0187855 A1 | 7/2014 | Nagale et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |

(56) References Cited

U.S. PATENT DOCUMENTS

| | | |
|---|---|---|
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1* | 7/2015 | Wachli ........... G09B 23/285 434/272 |
| 2015/0194075 A1 | 7/2015 | Rappel et al. |
| 2015/0202299 A1 | 7/2015 | Burdick et al. |
| 2015/0209035 A1 | 7/2015 | Zemlok |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0058534 A1 | 3/2016 | Derwin et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0125762 A1 | 5/2016 | Becker et al. |
| 2016/0133158 A1 | 5/2016 | Sui et al. |
| 2016/0140876 A1 | 5/2016 | Jabbour et al. |
| 2016/0194378 A1 | 7/2016 | Cass et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1* | 8/2016 | Hofstetter ........... G09B 23/285 |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |
| 2017/0018206 A1* | 1/2017 | Hofstetter ........... G09B 23/34 |
| 2017/0025044 A1* | 1/2017 | Saleh ........... G09B 23/30 |
| 2018/0005549 A1* | 1/2018 | Black ........... G09B 23/285 |
| 2018/0240366 A1* | 8/2018 | Felsinger ........... G09B 23/30 |

FOREIGN PATENT DOCUMENTS

| | | |
|---|---|---|
| CN | 2909427 Y | 6/2007 |
| CN | 101313842 A | 12/2008 |
| CN | 101528780 A | 9/2009 |
| CN | 201364679 Y | 12/2009 |
| CN | 201955979 U | 8/2011 |
| CN | 102458496 A | 5/2012 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 102596275 B | 6/2014 |
| CN | 103845757 A | 6/2014 |
| CN | 103886797 A | 6/2014 |
| CN | 103396562 B | 7/2015 |
| CN | 105194740 A | 12/2015 |
| CN | 105504166 A | 4/2016 |
| DE | 9102218 U1 | 5/1991 |
| DE | 41 05 892 A1 | 8/1992 |
| DE | 44 14 832 A1 | 11/1995 |
| DE | 19716341 A1 | 9/2000 |
| EP | 1 024 173 A1 | 8/2000 |
| EP | 2 218 570 A1 | 8/2010 |
| FR | 2 691 826 A1 | 12/1993 |
| FR | 2 917 876 A1 | 12/2008 |
| GB | 2488994 A | 9/2012 |
| JP | 10 211160 A | 8/1998 |
| JP | 2001005378 A | 1/2001 |
| JP | 2009236963 A | 10/2009 |
| JP | 3162161 U | 8/2010 |
| JP | 2013127496 A | 6/2013 |
| KR | 101231565 B1 | 2/2013 |
| MX | PA 02004422 A | 11/2003 |
| PT | 106230 | 9/2013 |
| WO | WO 1994/06109 A1 | 3/1994 |
| WO | WO 1996/042076 A1 | 12/1996 |
| WO | WO 1998/58358 A1 | 12/1998 |
| WO | WO 1999/01074 A1 | 1/1999 |
| WO | WO 2000/36577 A1 | 6/2000 |
| WO | WO 2002/38039 A2 | 5/2002 |
| WO | WO 2002/038039 A3 | 5/2002 |
| WO | WO 2004/032095 A1 | 4/2004 |
| WO | WO 2004/082486 A1 | 9/2004 |
| WO | WO 2005/071639 A1 | 8/2005 |
| WO | WO 2006/083963 A2 | 8/2006 |
| WO | WO 2007/068360 A1 | 6/2007 |
| WO | WO 2008/021720 A2 | 2/2008 |
| WO | WO 2008/103383 A1 | 8/2008 |
| WO | WO 2009/000939 A1 | 12/2008 |
| WO | WO 2009/089614 A1 | 7/2009 |
| WO | WO 2010/094730 A1 | 8/2010 |
| WO | WO 2011/035410 A1 | 3/2011 |
| WO | WO 2011/046606 A1 | 4/2011 |
| WO | WO 2011/127379 A2 | 10/2011 |
| WO | WO 2011/151304 A1 | 12/2011 |
| WO | WO 2012/149606 A1 | 11/2012 |
| WO | WO 2012/168287 A1 | 12/2012 |
| WO | WO 2012/175993 A1 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2014/197793 A1 | 12/2014 |
| WO | WO 2015/148817 A1 | 10/2015 |
| WO | WO 2016/138528 A1 | 9/2016 |
| WO | WO 2016/183412 A1 | 11/2016 |
| WO | WO 2016/198238 A1 | 12/2016 |
| WO | WO 2016/201085 A1 | 12/2016 |
| WO | WO 2017/031214 A1 | 2/2017 |
| WO | WO 2017/042301 A1 | 3/2017 |

OTHER PUBLICATIONS

The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.

The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.

The International Bureau of WIPO, International Preliminary Report on Patentability for International Application No. PCT/US2016/036664, entitled "Hysterectomy Model," dated Dec. 21, 2017, 10 pgs.

(56) References Cited

OTHER PUBLICATIONS

The International Bureau of WIPO, International Preliminary Report on Patentability for International Application No. PCT/US2016/041852, entitled "Simulated Dissectible Tissue," dated Jan. 25, 2018, 12 pgs.
European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018895, entitled "Synthetic Tissue Structures for Electrosurgical Training and Simulation," dated May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," dated Jun. 8, 2018, 13 pgs.
European Patent Office, The International Search Report and Written Opinion for International Application No. PCT/US2017/039113, entitled "Simulated Abdominal Wall," dated Aug. 7, 2017, 13 pgs.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," dated Aug. 20, 2018, 14 pgs.
The International Bureau of WIPO, International Preliminary Report on Patentability for International Application No. PCT/US2017/020389, entitled "Simulated Tissue Cartridge," dated Sep. 13, 2018, 8 pgs.
European Patent Office, Extended European Search Report for European Patent Application No. EP 18184147.9, titled "First Entry Model," dated Nov. 7, 2018, 7 pgs.
European Patent Office, Examination Report for European Application No. 14733949.3 titled "Gallbladder Model," dated Dec. 21, 2016, 6 pgs.
European Patent Office, The International Search Report and Written Opinion of the International Searching Authority for International Application No. PCT/US2016/062669 titled "Simulated Dissectible Tissue," dated Apr. 5, 2017, 19 pgs.
European Patent Office, The International Search Report and Written Opinion of the International Searching Authority for International Application No. PCT/US2017/020389 titled "Simulated Tissue Cartridge", dated May 24, 2017, 13 pgs.
The International Bureau of WIPO, International Preliminary Report on Patentability and Written Opinion for International Application No. PCT/US2015/059668, entitled "Simulated Tissue Models and Methods," dated May 26, 2017, 16 pgs.
European Patent Office, Invitation to Pay Additional Fees for International Application No. PCT/US2016/062669, titled "Simulated Dissectible Tissue", dated Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.
Society of Laparoendoscopic Surgeons, "Future Technology Session: The Edge of Innovation in Surgery, Space, and Business," htto://www.laparoscopytoday.com/ekdourology/page/2/ , Figure 1 B: , http://laparoscopy.blogs.com/laparoscopy_today/images/6-1/6-1VlaovicPicB.jpg Sep. 5-8, 2007, 10 pgs.
European Patent Office, International Search Report for International Application No. PCT/US2011/053859 A3, dated Apr. 5, 2012, entitled "Portable Laparoscopic Trainer," 8 pgs.
European Patent Office, The International Search Report and Written Opinion for International Application No. PCT/US2012/60997, entitled "Simulated Tissue Structure for Surgical Training," dated Mar. 7, 2013, 8 pgs.
European Patent Office, The International Search Report and Written Opinion for International Application No. PCT/US2012/070971, entitled "Advanced Surgical Simulation," dated Mar. 18, 2013, 10 pgs.
Human Patient Simulator, Medical Education Technologies, Inc., http://www.meti.com (1999) all, printed Apr. 12, 2013, 24 pgs.
The International Bureau of WIPO, International Preliminary Report on Patentability and Written Opinion for International Application No. PCT/US2011/053859, entitled "Portable Laparoscopic Trainer," dated Apr. 2, 2013, 9 pgs.
European Patent Office, The International Search Report and Written Opinion for International Application No. PCT/US2013/062363, entitled "Surgical Training Model for Laparoscopic Procedures," dated Jan. 22, 2014, 11 pgs.
European Patent Office, The International Search Report and Written Opinion for International Application No. PCT/US2013/061949, entitled "Surgical Training Model for Laparoscopic Procedures," dated Feb. 17, 2014, 7 pgs.
Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).
European Patent Office, The International Search Report and Written Opinion for International Application No. PCT/US2013/062269, entitled "Surgical Training Model for Transluminal Procedures," dated Feb. 17, 2014, 8 pgs.
European Patent Office, The International Search Report and Written Opinion for International Application No. PCT/US2013/061557, entitled "Surgical Training Model for Laparoscopic Procedures," dated Feb. 10, 2014, 9 pgs.
European Patent Office, The International Search Report and Written Opinion for International Application No. PCT/US2013/061728, entitled "Surgical Training Model for Laparoscopic Procedures," dated Oct. 18, 2013, 9 pgs.
Limps and Things, EP Guildford MATTU Hernia Trainer, http://limbsandthings.com/us/products/tep-guildford-mattu-hernia-trainer/, printed May 29,.2014, 11 pgs.
Simulab, Hernia Model, http://www.simulab.com/product/surgery/open/hernia model, printed printed May 29, 2014, 4 pgs.
McGill Laparoscopic Inguinal Hernia Simulator, Novel Low-Cost Simulator for Laparoscopic Inguinal Hernia Repair, Feb. 8, 2011, 1 pg.
University of Wisconsin-Madison Biomedical Engineering, Inguinal Hernia Model, http://bmedesign.engr.wisc.edu/projects/s10/hernia_model/, printed May 29, 2014, 62 pgs.
The International Bureau of WIPO, International Preliminary Report on Patentability for International Application No. PCT/US2012/070971, entitled "Advanced Surgical Simulation," dated Jun. 24, 2014, 7 pgs.
European Patent Office, The International Search Report and Written Opinion of the International Searching Authority for International Application No. PCT/US2014/038195, entitled "Hernia Model", dated Oct. 15, 2014, 20 pgs.
European Patent Office, The International Search Report and Written Opinion of the International Searching Authority for International Application No. PCT/US2014/048027, entitled "First Entry Model", dated Oct. 17, 2014, 10 pgs.
The International Bureau of WIPO, International Preliminary Report on Patentability for International Application No. PCT/US2012/060997, entitled "Simulated Tissue Structure for Surgical Training" dated Apr. 22, 2014, 6 pgs.
European Patent Office, The International Search Report and Written Opinion for International Application No. PCT/US2014/

(56) References Cited

OTHER PUBLICATIONS 019840, entitled "Advanced Surgical Simulation Constructions and Methods," dated Jul. 4, 2014, 8 pgs.
Kurashima, et al, "A tool for training and evaluation of Laparoscopic inguinal hernia repair; the Global Operative Assessment of Laparoscopic Skills-Groin Hernia" American Journal of Surgery, Paul Hoeber, New York, NY, US vol. 201, No. 1, Jan. 1 2011, pp. 54-61 XP027558745.
European Patent Office, The International Search Report and Written Opinion for International Application No. PCT/US2014/042998, entitled "Gallbladder Model," dated Jan. 7, 2015, 20 pgs.
The International Bureau of WIPO, International Preliminary Report on Patentability, for PCT application No. PCT/US2013/053497, entitled Simulated Stapling and Energy Based Ligation for Surgical Training, dated Feb. 12, 2015, 6 pgs.
The International Bureau of WIPO, International Preliminary Report on Patentability for International Application No. PCT/US2013/062363, entitled "Surgical Training Model for Laparoscopic Procedures," dated Apr. 9, 2015, 9 pgs.
The International Bureau of WIPO, International Preliminary Report on Patentability for International Application No. PCT/US2013/062269, entitled "Surgical Training Model for Laparoscopic Procedures," dated Apr. 9, 2015, 6 pgs.
The International Bureau of WIPO, International Preliminary Report on Patentability for International Application No. PCT/US2013/061557, entitled "Surgical Training Model for Laparoscopic Procedures," dated Apr. 9, 2015, 6 pgs.
The International Bureau of WIPO, International Preliminary Report on Patentability for International Application No. PCT/US2013/061728, entitled "Surgical Training Model for Laparoscopic Procedures," dated Apr. 9, 2015, 7 pgs.
The International Bureau of WIPO, International Preliminary Report on Patentability for International Application No. PCT/US2013/061949, entitled "Surgical Training Model for Laparoscopic Procedures," dated Apr. 9, 2015, 6 pgs.
The International Bureau of WIPO, International Preliminary Report on Patentability for International Application No. PCT/US2014/019840, entitled "Simulated Tissue Structure for Surgical Training," dated Sep. 11, 2015, 8 pgs.
European Patent Office, The International Search Report and Written Opinion for International Application No. PCT/US2015/020574, entitled "Advanced First Entry Model for Surgical Simulation," dated Jun. 1, 2015, 12 pgs.
European Patent Office, The International Search Report and Written Opinion for International Application No. PCT/US2015/022774, entitled "Simulated Dissectible Tissue," dated Jun. 11, 2015, 13 pgs.
Anonymous: Silicone rubber-from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/038195, entitled "Hernia Model," dated Nov. 26, 2015, 16 pgs.
The International Bureau of WIPO, International Preliminary Report on Patentability for International Application No. PCT/US2014/042998, entitled "Gallbladder Model," dated Dec. 30, 2015, 15 pgs.
European Patent Office, International Search Report and Written Opinion for International Application No. PCT/US2013/053497, titled "Simulated Stapling and Energy Based Ligation for Surgical Training," dated Nov. 5, 2013, 8 pgs.
The International Bureau of WIPO, International Preliminary Report on Patentability for International Application No. PCT/US2014/048027, entitled "First Entry Model," dated Feb. 4, 2016, 8 pgs.

European Patent Office, International Search Report and Written Opinion for International Application No. PCT/US2015/059668, entitled "Simulated Tissue Models and Methods," dated Apr. 26, 2016, 20 pgs.
Australian Patent Office, Patent Examination Report No. 1 for Australian Application No. 2012358851, titled "Advanced Surgical Simulation," dated May 26, 2016, 3 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2016/032292, entitled "Synthetic Tissue Structures for Electrosurgical Training and Simulation," dated Jul. 14, 2016, 11 pgs.
European Patent Office, International Search Report and Written Opinion for International Application No. PCT/US2016/018697, entitled "Simulated Tissue Structures and Methods," dated Jul. 14, 2016, 21 pgs.
European Patent Office, International Search Report and Written Opinion for International Application No. PCT/US2016/034591, entitled "Surgical Training Model for Laparoscopic Procedures," dated Aug. 8, 2016, 18 pgs.
European Patent Office, The International Search Report and Written Opinion of the International Searching Authority for International Application No. PCT/US2016/036664, entitled "Hysterectomy Model", dated Aug. 19, 2016, 15 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", dated Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", dated Oct. 13, 2016, 12 pgs.
3D-Med Corporation, "Validated Training Course for Laparoscopic Skills," https://www.3-dmed.com/sites/default/files/product-additional/product-spec/Validated%20Training%20Course%20for%20Laparoscopie%20Skills.docx__3.pdf, printed Aug. 23, 2016, pp. 1-6.
3D-Med Corporation, "Loops and Wire #1," https://www.3-dmed.com/product/loops-and-wire-1, printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
The International Bureau of WIPO, International Preliminary Report on Patentability for International Application No. PCT/US2017/039113, entitled "Simulated Abdominal Wall," dated Jan. 10, 2019, 8 pgs.
European Patent Office, Extended European Search Report for European Patent Application No. EP 18210006.5, titled "Surgical Training Model for Laparoscopic Procedures," dated Jan. 21, 2019, 7 pgs.
European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Feb. 4, 2019, 6 pgs.
European Patent Office, Extended European Search Report for European Patent Application No. EP 18216005.1, titled "Surgical Training Model for Laparoscopic Procedures," dated Feb. 4, 2019, 7 pgs.

(56) References Cited

OTHER PUBLICATIONS

European Patent Office, Extended European Search Report for European Patent Application No. EP 19159065.2, titled "Simulated Tissue Structures and Methods," dated May 29, 2019, 8 pgs.

The International Bureau of WIPO, International Preliminary Report on Patentability for International Application No. PCT/US2018/018036, entitled "Laparoscopic Training System," dated Aug. 29, 2019, 8 pgs.

The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.

\* cited by examiner

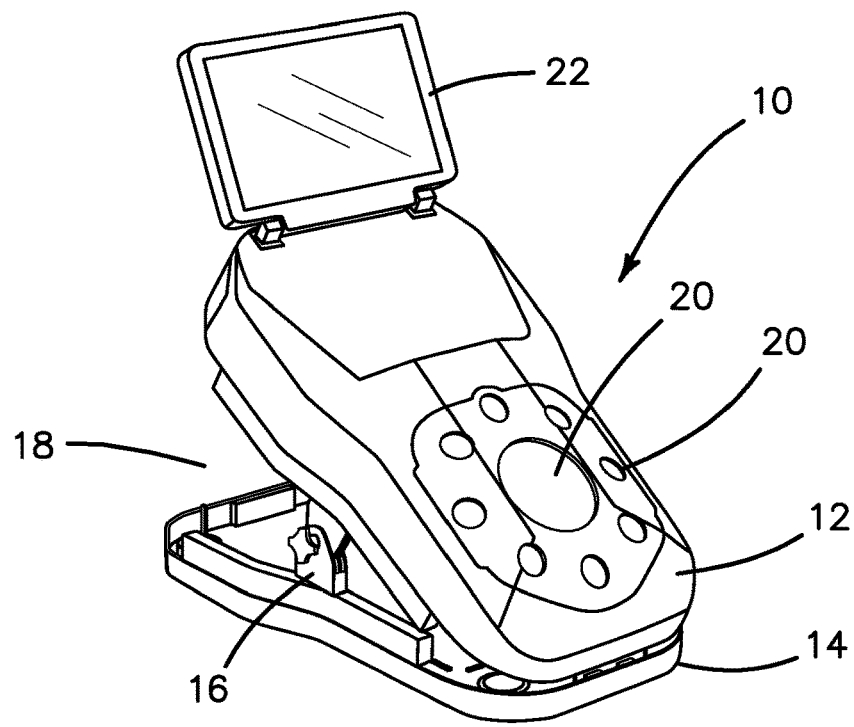
FIG. 1
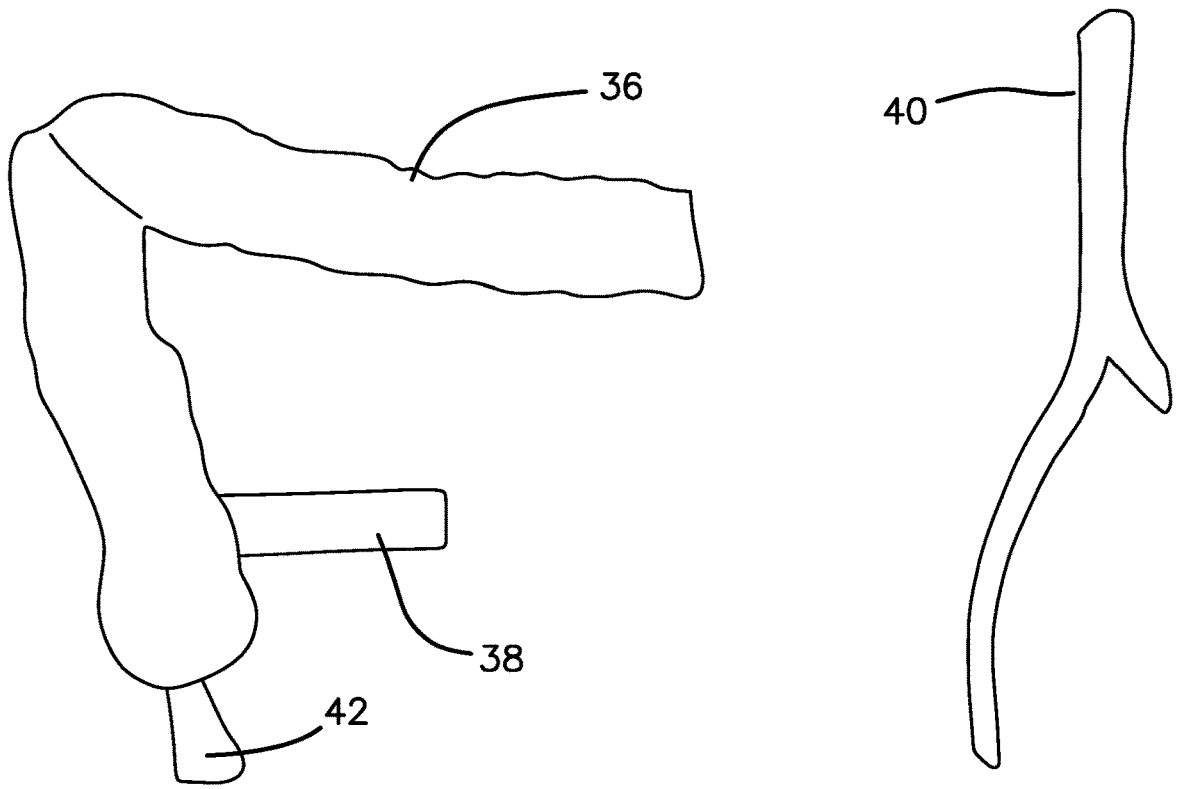
FIG. 4
FIG. 5

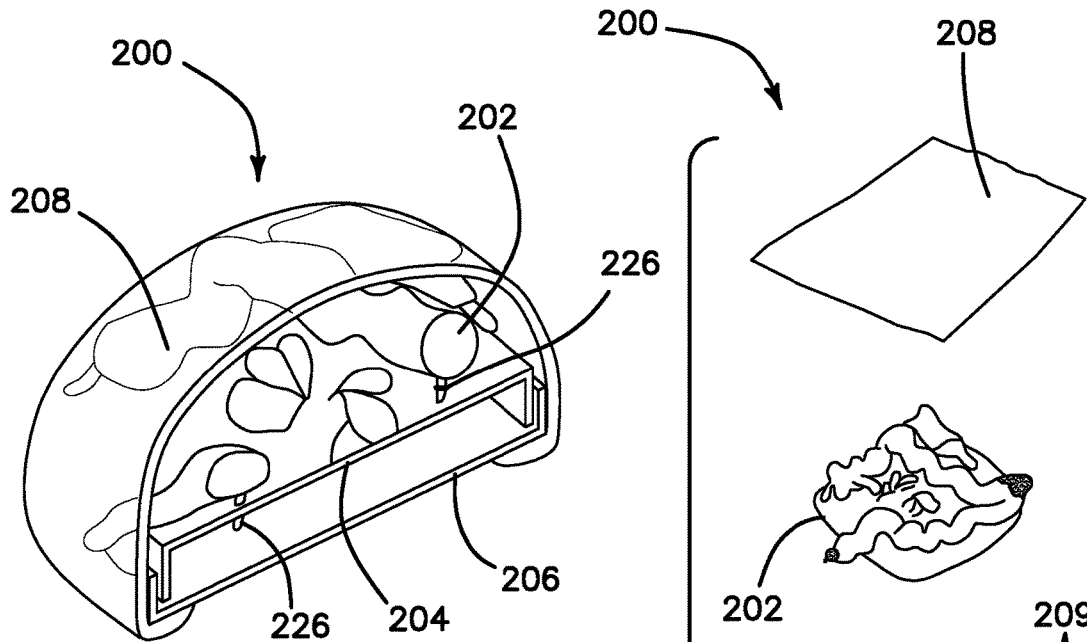
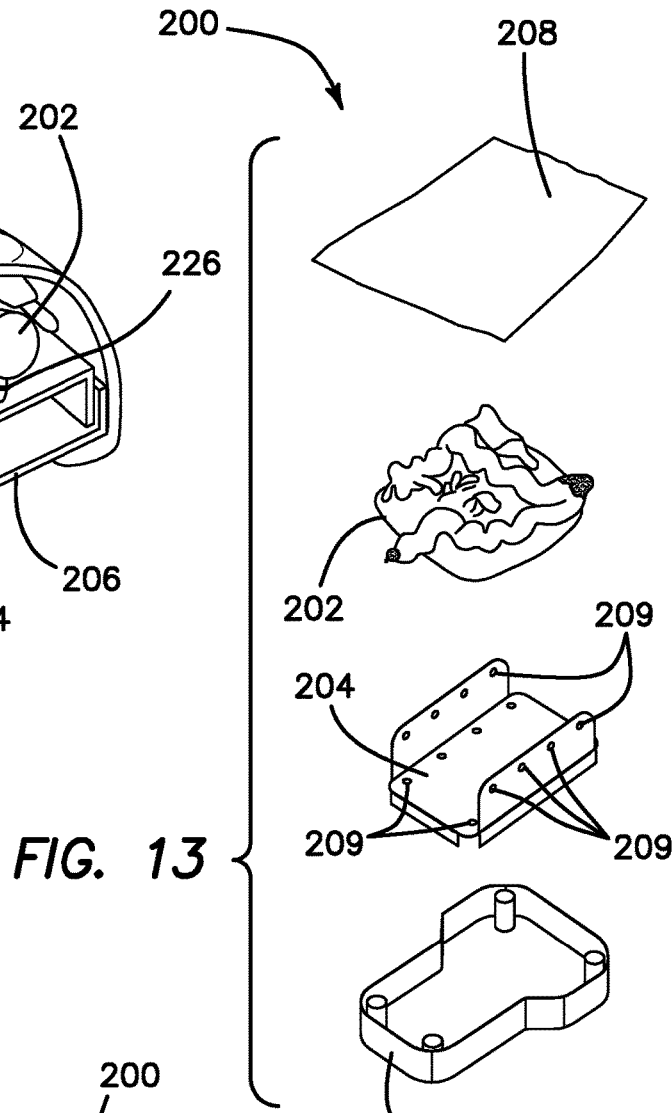
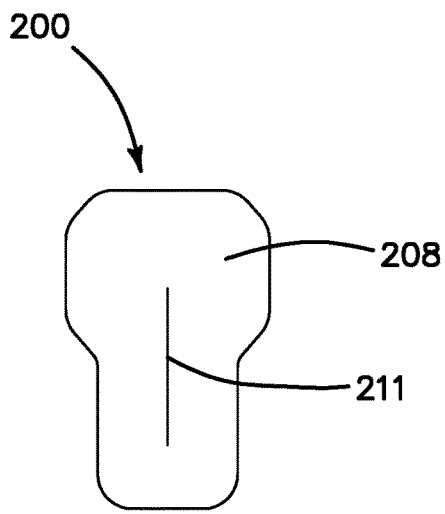
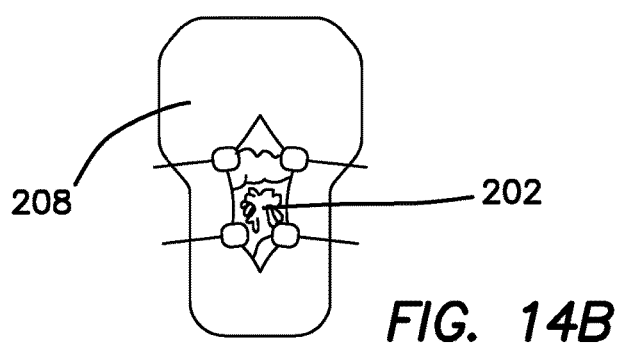
FIG. 12
FIG. 13
FIG. 14A
FIG. 14B

SIMULATED DISSECTIBLE TISSUE

This application claims priority to and benefit of U.S. Provisional Patent Application Ser. No. 62/258,710 entitled "Simulated dissectible tissue" filed on Nov. 23, 2015 which is incorporated herein by reference in its entirety. This application also claims priority to and benefit of U.S. Provisional Patent Application Ser. No. 62/257,847 entitled "Simulated dissectible tissue" filed on Nov. 20, 2015 which is incorporated herein by reference in its entirety.

FIELD OF THE INVENTION

This invention relates to surgical training tools, and in particular, to simulated tissue structures and models for teaching and practicing surgical procedures.

BACKGROUND OF THE INVENTION

A laparoscopic colectomy involves the resection of the bowel at various locations. Depending on the location, the colectomy is called a right hemicolectomy, a left hemicolectomy, a sigmoid colectomy, or a total colectomy. A right hemicolectomy is the removal of the entirety of the ascending colon through a portion of transverse colon, and is the most common among the colectomy procedures. A critical step of a right hemicolectomy procedure is the ability to identify key anatomical landmarks and vasculature in order to transect the appropriate vessels and adhesions to enable the mobilization of the colon. A surgeon's first step of the procedure is to identify and transect the ileocolic vessels. The ileocolic vessels are taken down with the help of the patient being in the Trendelenburg body position with the right side upwardly positioned. This body position aides in moving away the omentum and small bowel. The ileocolic vessels are typically located adjacent to the duodenum and are encased within a mesentery layer that is made up of two peritoneum layers. During this step, the surgeon uses the duodenum as a structural landmark in locating the ileocolic vessels. Upon transection of the ileocolic vessels, there can be either a medial to lateral or lateral to medial dissection of the mesentery layer. This dissection is done through blunt dissection using laparoscopic tools or energy compatible devices that can cut and seal smaller vasculature and lymph nodes encased within the mesentery layer. For medial to lateral dissection movement is made anterior to the duodenum and Gerota's fascia to the root of the mesentery attached to the cecum and ileum. If a surgeon moves lateral to medial, dissection is performed at the ileocecal junction and moves medially, again ensuring to stay anterior to the duodenum and Gerota's fascia. Once the cecum and ileum are mobilized, the surgeon will move up the White Line of Toldt in order to reach the hepatic flexure of the colon. The White Line of Toldt is an avascular plane that is connected to the abdominal side wall through lateral adhesions. A surgeon typically takes down these adhesions and the White Line of Toldt using laparoscopic scissors or other laparoscopic devices compatible with energy. Upon taking down the White Line of Toldt, adhesions along the hepatic flexure are removed in order to allow the extracorporeal mobilization and transection of the bowel. Upon transection of bowel the surgeon performs an extracorporeal anastomosis, which reconnects the remaining bowel.

Since there are several procedural steps for a right hemicolectomy, it is important that surgeons have a way to learn and practice this surgical procedure. The model needs to be anatomically correct and include the key landmarks as well as vasculature involved with right hemicolectomy procedures. The model should be compatible with any variation of the procedural steps. As an example, either medial to lateral or lateral to medial dissection should be able to be performed on the model. Moreover, the model needs to simulate the tactile feedback that a surgeon observes during the procedure. As an example, when dissection through the mesentery layer is performed, the difference in the feeling going through the layers to get to large vessels should be apparent. Vessels should be able to be grasped, cut and clipped. Although there are several procedural steps, the majority of this procedure involves mobilizing the bowel through various dissection techniques; therefore, developing an accurate dissection model is crucial to the simulation. The organs in the model should be simulated to be able to be moved and maneuvered as they would be in the body. Additionally, the organs on the model should be attached to the model so that they can be moved in the correct direction as positioning of the model is placed in Trendelenberg or reverse Trendelenberg body positioning. There is a need for an anatomical model that addresses these issues.

Furthermore, surgical residents as well as practicing surgeons undergo extensive training prior to being qualified to practice surgery on human patients. The training teaches a variety of aspects of surgery, which can include training to develop a specific skill, to practice a specific surgical procedure, or to practice using certain surgical instruments. There is a need for synthetic simulated models that will facilitate the training for surgeons. Specifically, there is a need for a simulated tissue that closely resembles the response of human tissue that is being dissected. The ability to perform dissection between planes or dissection to skeletonize vasculature from surrounding anatomy is a skill that is found within surgical procedures. Particularly, if a laparoscopic procedure is performed, maneuvering of instruments to perform dissection is a skill that can be acquired, which will allow for an atraumatic procedure with minimal injury. The present invention sets forth such a simulated tissue.

SUMMARY OF THE INVENTION

According to one aspect of the invention, a simulated dissectible tissue for surgical training is provided. The simulated dissectible tissue includes a first layer made of silicone and having an inner surface and an outer surface defining a thickness therebetween. The simulated dissectible tissue includes a second layer made of silicone and having an inner surface and an outer surface defining a thickness therebetween. The simulated dissectible tissue includes a third layer comprising silicone gel located between the first layer and the second layer. The silicone gel is sealed by the first and second layers. The first and second layers are incisable and the third layer elastically adheres the first and layers together such that the first and second layers are separable with a blunt instrument.

According to another aspect of the invention, a simulated dissectible tissue for surgical training is provided. The simulated dissectible tissue includes an outer shell made of silicone and configured to form an interior cavity. A filling is located and sealed inside the interior cavity. The encapsulated filling comprises a silicone gel and the outer shell is separable in the location of the filling to emulate surgical skeletonization.

According to another aspect of the invention, a method for manufacturing a simulated dissectible tissue for surgical training is provided. The method includes providing a first layer of silicone, curing the first layer, providing a mold having a central cavity, placing the first layer of silicone onto the mold such that the first layer covers central cavity, preparing a silicone gel, applying the uncured silicone gel onto the first layer, providing a second layer of silicone, placing the second layer over the silicone gel and the first layer, curing the silicone gel and curing the second layer.

According to another aspect of the invention, a method of manufacturing a simulated dissectible tissue comprising one or more outer layer encapsulating an inner layer is provided. The method includes the steps of selecting a material for the outer layer. The step of selecting a material for the outer layer includes selecting one of a silicone and a mixture of silicone and deadener. The method including the step of selecting a material for the inner layer. The step of selecting a material for the inner layer includes selecting one of a silicone gel and a mixture of silicone gel and deadener.

According to another aspect of the invention, a simulated dissectible tissue structure for surgical training is provided. The simulated dissectible tissue structure includes a first cylinder of silicone having an outer surface and an inner surface defining a first lumen. The simulated dissectible tissue structure further includes a second cylinder of silicone having an outer surface and an inner surface defining a second lumen and a third cylinder of silicone having an outer surface and an inner surface defining a third lumen. The simulated dissectible tissue structure includes a fourth cylinder of polyfill located between the third cylinder and second cylinder. A frame defining an interior and an exterior is provided. The first cylinder, second cylinder, third cylinder and fourth cylinder are suspended inside the interior of the frame. The first cylinder is located inside the second lumen of the second cylinder and the second cylinder is located inside the third lumen of the third cylinder.

According to another aspect of the invention, a simulated dissectible tissue structure for surgical training is provided. The simulated dissectible tissue structure includes a top layer of silicone having an upper surface and a lower surface defining a thickness therebetween, a bottom layer of silicone having an upper surface and a lower surface defining a thickness therebetween, and a middle layer located between the top layer and the bottom layer. A least one simulated vessel of silicone is located inside the middle layer. The simulated dissectible tissue structure includes a second layer of silicone having an upper surface and a lower surface defining a thickness therebetween. The simulated dissectible tissue structure includes a third layer of polyfill located between the second layer and bottom layer.

According to another aspect of the invention, a simulated dissectible tissue structure is provided. The simulated dissectible tissue structure includes a simulated organ made of silicone. One or more fastener is connected to the simulated organ. The simulated dissectible tissue structure includes a tray made of rigid material. The tray includes a base and a supportive platform. The supportive platform is spaced apart and above the base. The tray includes one or more fastener location. The simulated organ is connected to the tray via connection of the one or more fastener with the one or more fastener location. The one or more fastener is removably connectable to the one or more fastener location.

BRIEF DESCRIPTION OF THE DRAWINGS

FIG. 1 is a top perspective view of a laparoscopic trainer.
FIG. 4 is a top view of a large bowel of a right colon model according to the present invention.
FIG. 5 is a top view of an aorta of a right colon model according to the present invention.
FIG. 12 is a cross-sectional, perspective view of an organ model according to the present invention.
FIG. 13 is an exploded view of an organ model according to the present invention.
FIG. 14A is a top view of an organ model with an incision according to the present invention.
FIG. 14B is a top view of an organ model with a retracted incision according to the present invention.

DETAILED DESCRIPTION OF THE INVENTION

Figure 2:
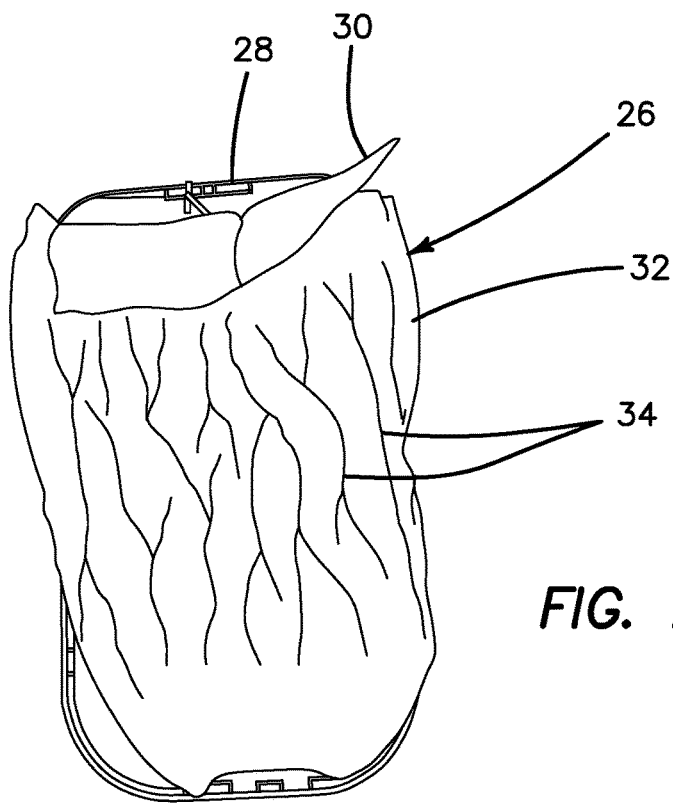
FIG. 2 is a top view of a right colon model according to the present invention.

Organ tray models of one or more simulated organs and tissues are ideal for training and practicing laparoscopic procedures and techniques when placed inside a simulated laparoscopic trainer like the SIMSEI® laparoscopic training system manufactured by Applied Medical Resources Corporation in California. A laparoscopic trainer 10 is shown in FIG. 1. The laparoscopic trainer 10 is described in co-pending U.S. patent application Ser. No. 13/248,449 entitled "Portable laparoscopic trainer" and filed on Sep. 29, 2011 by Pravong et al. to Applied Medical Resources Corporation and published as U.S. Patent Publication No. 2012/0082970, hereby incorporated by reference in its entirety herein. The laparoscopic trainer 10 includes a top cover 12 connected to a base 14 by a pair of legs 16 spacing the top cover 12 from the base 14. The laparoscopic trainer 10 is configured to mimic the torso of a patient such as the abdominal region. The top cover 12 is representative of the anterior surface of the patient and the space between the top cover 12 and the base 14 is representative of an interior of the patient or body cavity 18 where organs reside. The laparoscopic trainer 10 is a useful tool for teaching, practicing and demonstrating various surgical procedures and their related instruments in simulation of a patient. Surgical instruments are inserted into the cavity 18 through pre-established apertures 20 in the top cover 12. These pre-established apertures 20 may include seals that simulate trocars or may include simulated tissue that simulates the patient's skin and abdominal wall portions. Various tools and techniques may be used to penetrate the top cover 12 to perform mock procedures on model organs placed between the top cover 12 and the base 14 such as the right colon model of the present invention. When placed inside the cavity 18 of the trainer 10, the organ model is generally obscured from the perspective of the user who can then practice performing surgical techniques laparoscopically by viewing the surgical site indirectly via a video feed displayed on a video monitor 22.

A video display monitor 22 that is hinged to the top cover 12 is shown in an open orientation in FIG. 1. The video monitor 22 is connectable to a variety of visual systems for delivering an image to the monitor 22. For example, a laparoscope inserted through one of the pre-established apertures 20 or a webcam located in the cavity and used to observe the simulated procedure can be connected to the video monitor 22 and/or a mobile computing device to provide an image to the user. In another variation, the top cover 12 does not include a video display 22 but includes means for supporting a laptop computer, a mobile digital device or tablet and connecting it by wire or wirelessly to the trainer 10.

When assembled, the top cover 12 is positioned directly above the base 14 with legs 16 located substantially at the periphery and interconnected between the top cover 12 and base 14. The top cover 12 and base 14 are substantially the same shape and size and have substantially the same peripheral outline. Although the trainer 10 has no sidewalls, the legs 16 partially obscure the internal cavity from view from an otherwise open-sided trainer 10. The laparoscopic trainer 10 includes a top cover 12 that angulates with respect to the base 14. The legs 16 are configured to permit the angle of the top cover 12 with respect to the base 14 to be adjusted. FIG. 1 illustrates the trainer 10 adjusted to an angulation of approximately 30-45 degrees with respect to the base 14. The angulation of the trainer 10 advantageously simulates a patient in a Trendelenburg or reverse Trendelenburg position. In the Trendelenburg position the body is tilted such that it is laid flat on the back with the feet higher than the head or vice versa. The Trendelenburg position allows better access to the pelvic organs as gravity pulls the intestines away from the pelvis to thereby prevent encroachment of the intestines upon the pelvic operating field to provide more working space inside the abdominal cavity in which the surgeon can more easily manipulate organs. The selected angulation of the top cover 12 is locked by tightening thumbscrews provided on the legs 16. The angulation of the top cover 12 of the trainer 10 with respect to the base 14 or of the top cover 12 with respect to a horizontal surface such as a table top is particularly advantageous with respect to training and practicing a right hemicolectomy with the colon model of the present invention inserted into the cavity 18 of the trainer 10.

Turning now to FIG. 2, there is shown a right colon model 26 of the present invention that is particularly suitable for training and practicing a right hemicolectomy procedure among other procedures in a laparoscopic environment such as a laparoscopic trainer 10 described above with respect to FIG. 1. The simulated organs are typically made of silicone or thermoplastic elastomer (TPE) and placed in a tray 28. The tray 28 is configured to contain the model organs disposed within the tray 28. The tray 28 includes a base and at least one sidewall typically formed around the perimeter of the base. Additional sidewalls are formed inside the perimeter to define anatomy-specific locations and configured to contain simulated organ structures and tissues. These additional sidewalls provide lateral support in response to forces applied by the practitioner while manipulated the simulated organs with instruments inserted through the top cover 12 of the trainer 10 with the model 26 disposed within the cavity 18. FIG. 2 illustrates a model liver 30 made of silicone located along the top of the tray 28 and a simulated omentum layer 32 overlaying other organs and including representative vasculature 34.

Figure 3:
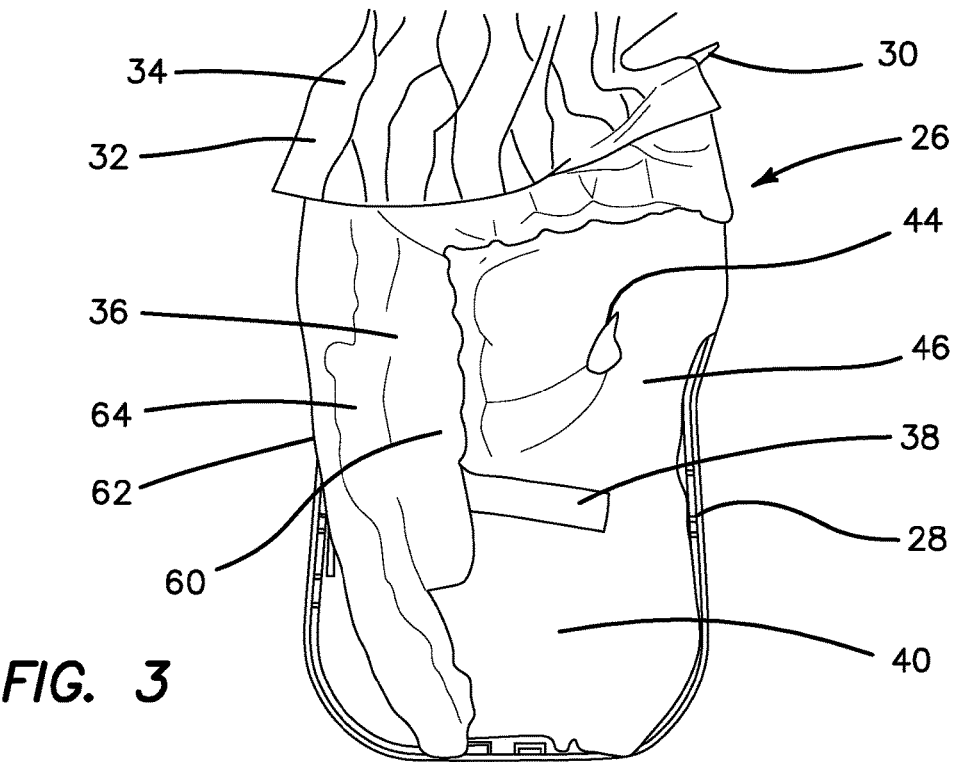
FIG. 3 is a top view of a right colon model with an omentum layer pulled back according to the present invention.

Turning to FIG. 3, the omentum layer 32 is shown pulled back to uncover the underlying simulated organs that include at least a portion of a large bowel 36 (shown isolated in FIG. 4) that can be attached to an appendix 42 and sigmoid colon, at least a portion of a small bowel 38, a liver 30 containing a gallbladder assembly, a stomach, a duodenum, kidneys, ureters, an aorta 40 (shown isolated in FIG.

Figure 6:
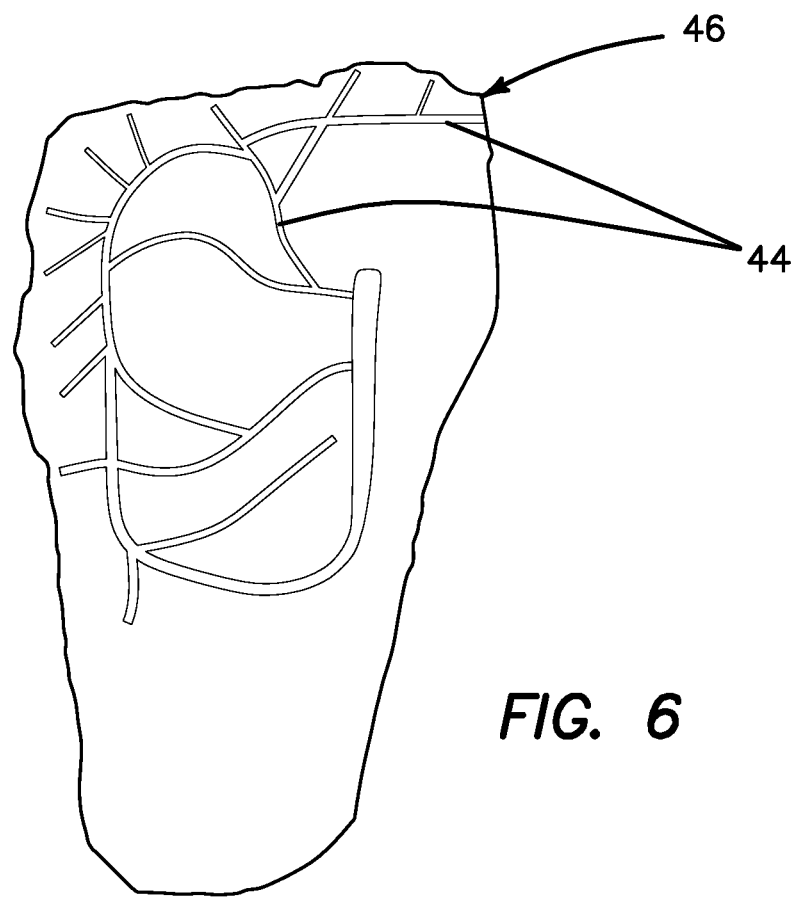
FIG. 6 is a top view of a simulated tissue structure such as a mesentery layer according to the present invention.

5), vessels representing arteries and veins 44, and connective tissue layers including peritoneum, Gerota's fascia, and a mesentery layer 46 (shown isolated in FIG. 6). The organs are assembled to represent the correct anatomical positioning and location present in the human body for surgical training using a variety of laparoscopic instruments. The right colon model 26 which can also be called the right bowel model 26 is assembled using silicone simulated organs with modification to emphasize key landmarks and features for a right hemicolectomy surgical training.

A base tray 28 is provided. The base tray 28 is made of yellow or red foam and sized and configured to be insertable into the cavity 18 of the trainer 10. Alternatively, the base tray 28 may include a liner that is made of yellow or red foam that fits directly into the base tray 28 which together with the liner is insertable into the laparoscopic trainer 10. An additional foam portion can be added to the left side of the foam base in order to simulate the right abdominal side wall. To allow simulation of various body positions during the simulated surgical procedure, alternative model bases are provided. For example, the right colon model base 28 or liner can be made from a vacuum formed plastic to have an inclined angle at one end of the model 26. The angle may simulate reverse Trendelenberg positioning of the patient during the surgical procedure. Moreover, the model 26 can be built on a vacuum-formed plastic base to have a curved shape that is modeled to mimic a pelvis shape that extends proximally to form the curved shape of the abdominal side walls.

A sheet made of silicone is adhered on top of the model's base 28 to aid in the attachment and assembly of the simulated organs. A list of the simulated organs which are made of silicone and their colors can be found in Table 1 below. The large bowel 36, aorta 40 and mesentery 46 can remain the substantially the size shown in FIGS. 2 and 3, or they can be shortened or shrunk in order to better fit the base of the laparoscopic trainer 10. These anatomical structures are adhered to the top of the foam base tray 28 in a manner that closely represents their accurate relative anatomical positioning.

TABLE 1

Organs & Their Colors

| Organ | Color |
| --- | --- |
| Large Bowel | Pink |
| Small Bowel | Pink |
| Appendix | Pink |
| Cecum | Pink |
| Stomach | Flesh tone or pink |
| Kidney | Dark Red |
| Liver | Dark Red |
| Gallbladder | Green to Brown |
| Aorta | Dark Red |
| Duodenum | Flesh tone |
| Arteries | Dark Red |
| Veins | Blue |
| Ureters | Clear |
| Omentum | Yellow |
| Mesentery | Yellow |
| Adhesion | Pink |
| Peritoneum | Yellow or white |

The mesentery layer 46 encapsulates arteries and veins 44 and is configured to be grasped and dissected using laparoscopic dissectors. Dissection between tissue layers has characteristics that cannot be simulated by silicone alone. Therefore, in order solve this issue, several variations of a simulated dissectible tissue suitable for simulating real anatomical structures such as the mesentery 46 have been developed. The simulated dissectible tissue suitable for simulating the mesentery 46 is composed of three layers stacked on top of each other. The three layers include a top layer 48, a bottom layer 50 and the middle layer 54. The top layer 48 and the bottom layer 50 may represent peritoneum layers and the middle layer 54, which comprises gel, may represent the connective tissue surrounding the blood vessels 44 made of silicone that can be dissected.

Figure 7A:
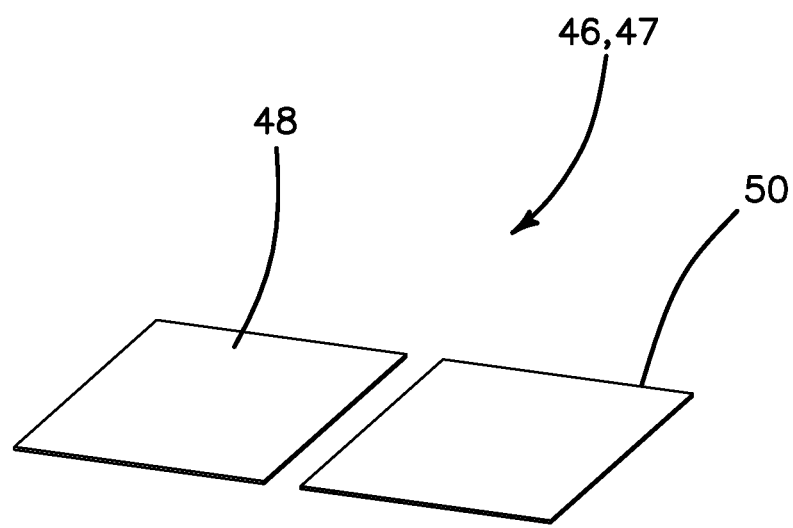
FIGS. 7A-7E are schematic drawings illustrating the steps of a manufacturing process for a simulated tissue structure such as a mesentery layer according to the present invention.
Figure 7B:
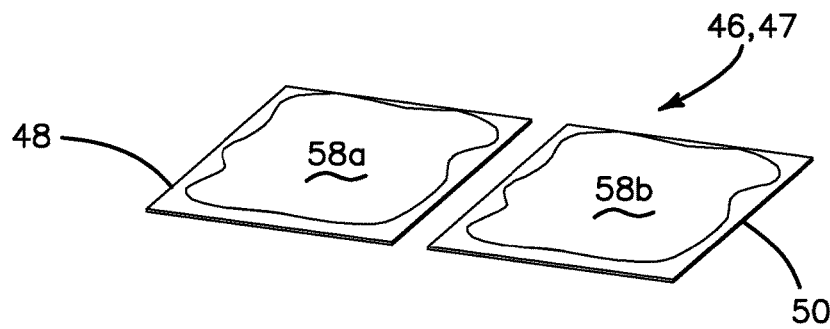
Figure 7C:
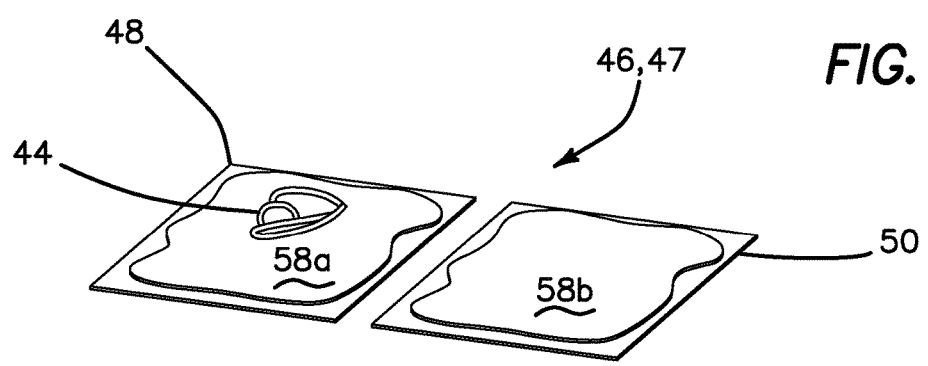

With reference now to FIGS. 7A-7E, the construction of the simulated dissectible tissue according to the present invention which can find exemplary use as mesentery layer 46 will now be described. It is noted that, the simulated dissectible tissue 47 of the present invention is not limited to use as a mesentery layer 46 but can form at least a part of any simulated tissue construction. Constructing the simulated dissectible tissue 47 involves an initial step of creating two separate thin sheets of silicone, one for the top layer 48 and one for the bottom layer 50 and letting them fully cure as shown in FIG. 7A. When the sheets are fully cured, a thin layer of silicone gel 58a, 58b is spread, using a spatula or a similar tool, on the untextured side of the each of the silicone sheets 48, 50, respectively, as shown in FIG. 7B. Simulated vasculature 44, comprising silicone vessels, is laid over one of either of the uncured gel layers 58a, 58b. FIG. 7C illustrates the simulated vasculature 44 being placed on the uncured gel layer 58a on the top layer 48 sheet. The silicone sheets 48, 50 with the gel layers 58a, 58b are then allowed to fully cure to adhere the simulated vasculature 44 to the top layer 48. When the gel-lined layers 48, 50 are cured, a third or middle layer 54 comprising fresh silicone gel is prepared and poured over one of the layers 48, 50. In one variation, the fresh silicone gel is poured over the silicone sheet 48 that has the silicone vessels 44 laid out. The gel is spread to completely cover the simulated vessels of the vasculature 44. The second layer 50 sheet is then laid over the middle layer 54 atop the first layer 48 while the silicone is still uncured gel and air pockets are pushed out to the edges to create a sandwich-like construction. The result of this process is the three-layered simulated dissectible tissue 47 that can be used to simulate a mesentery assembly 46 such as depicted in FIG. 6 that is particularly suitable and compatible with laparoscopic dissection and skeletonization of the encapsulated vasculature 44 located between the layers. Having multiple layers provides for an accurate, realistic feel and function for the simulated dissectible tissue structure. Furthermore, the simulated dissectible tissue 47 advantageously creates various tissue planes through which the practitioner may practice dissection skills. Not only does the model 26 provide the ability to dissect the layers but also allows the practitioner to properly identify the tissue planes or layers 44, 48, 50, 54, 58a, 58b which is an important skill to learn for each individual procedure. In one variation, the simulated dissectible tissue 47 is constructed without the vasculature layer 44 and can also be used to practice dissection.

Figure 8A:
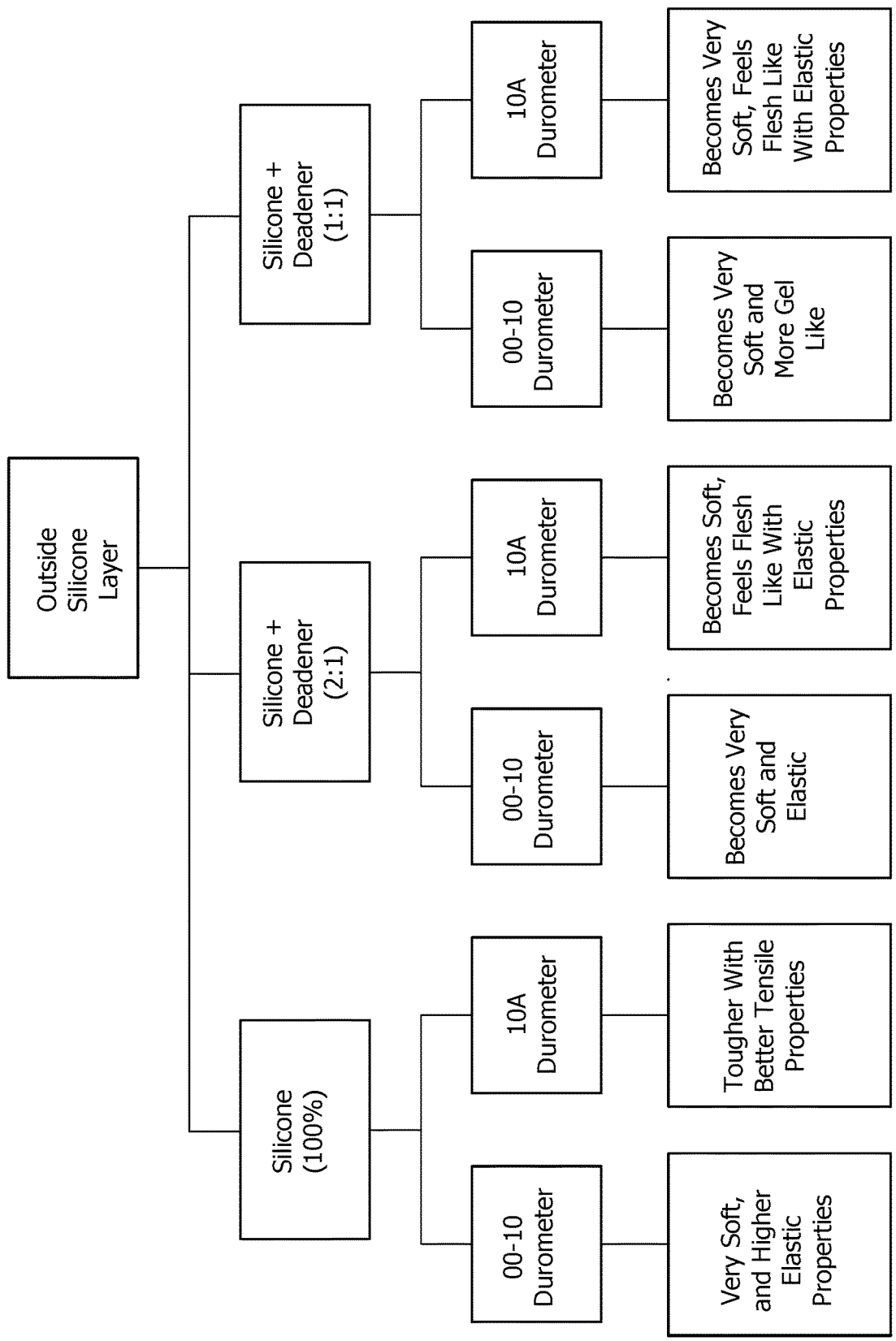
FIG. 8A is a list of composition variations for the outside layers of a simulated tissue structure such as a mesentery layer according to the present invention.
Figure 8B:
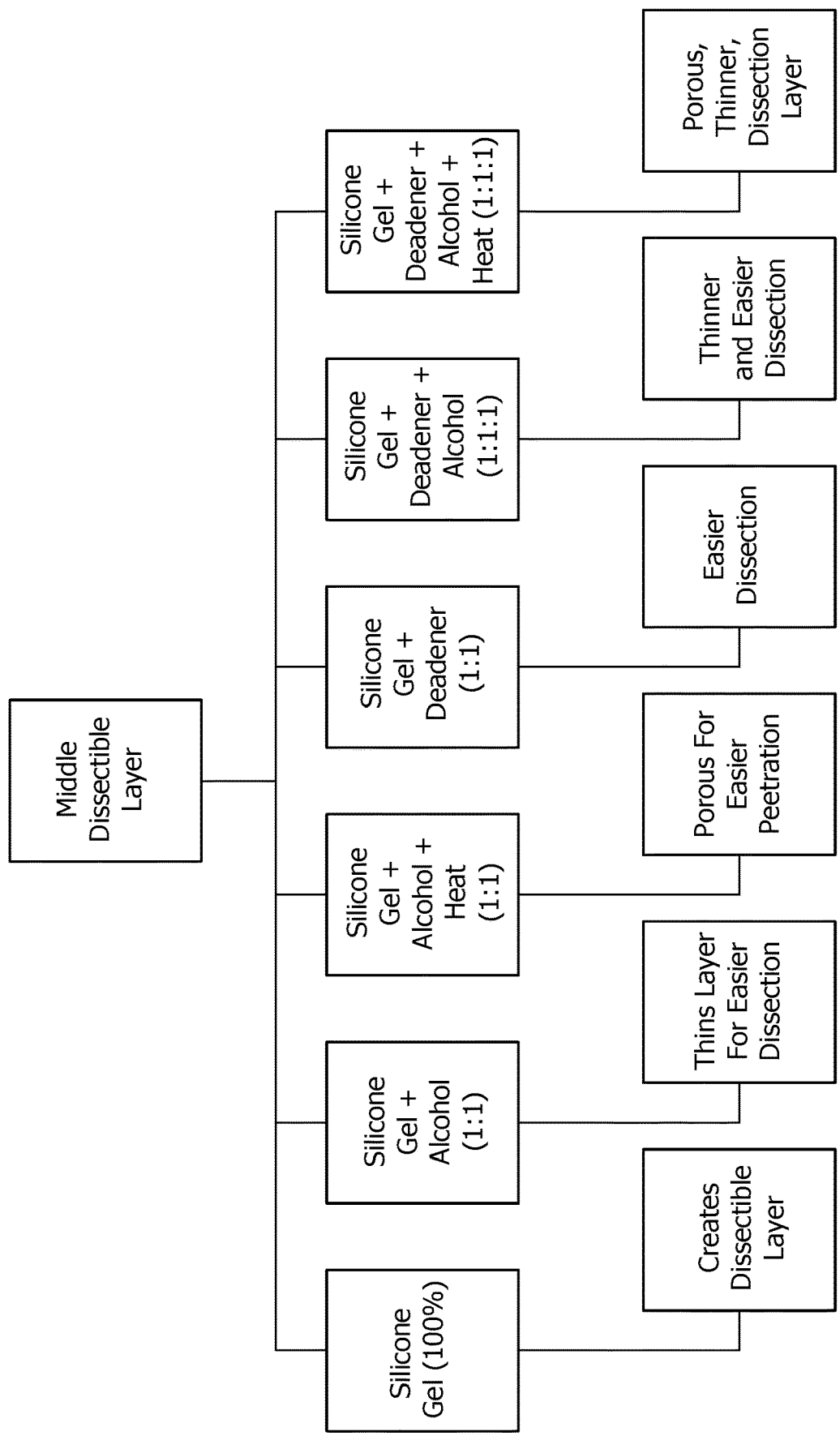
FIG. 8B is a list of composition variations for the middle or inner layer of a simulated tissue structure such as a mesentery layer according to the present invention.
Figure 9A:
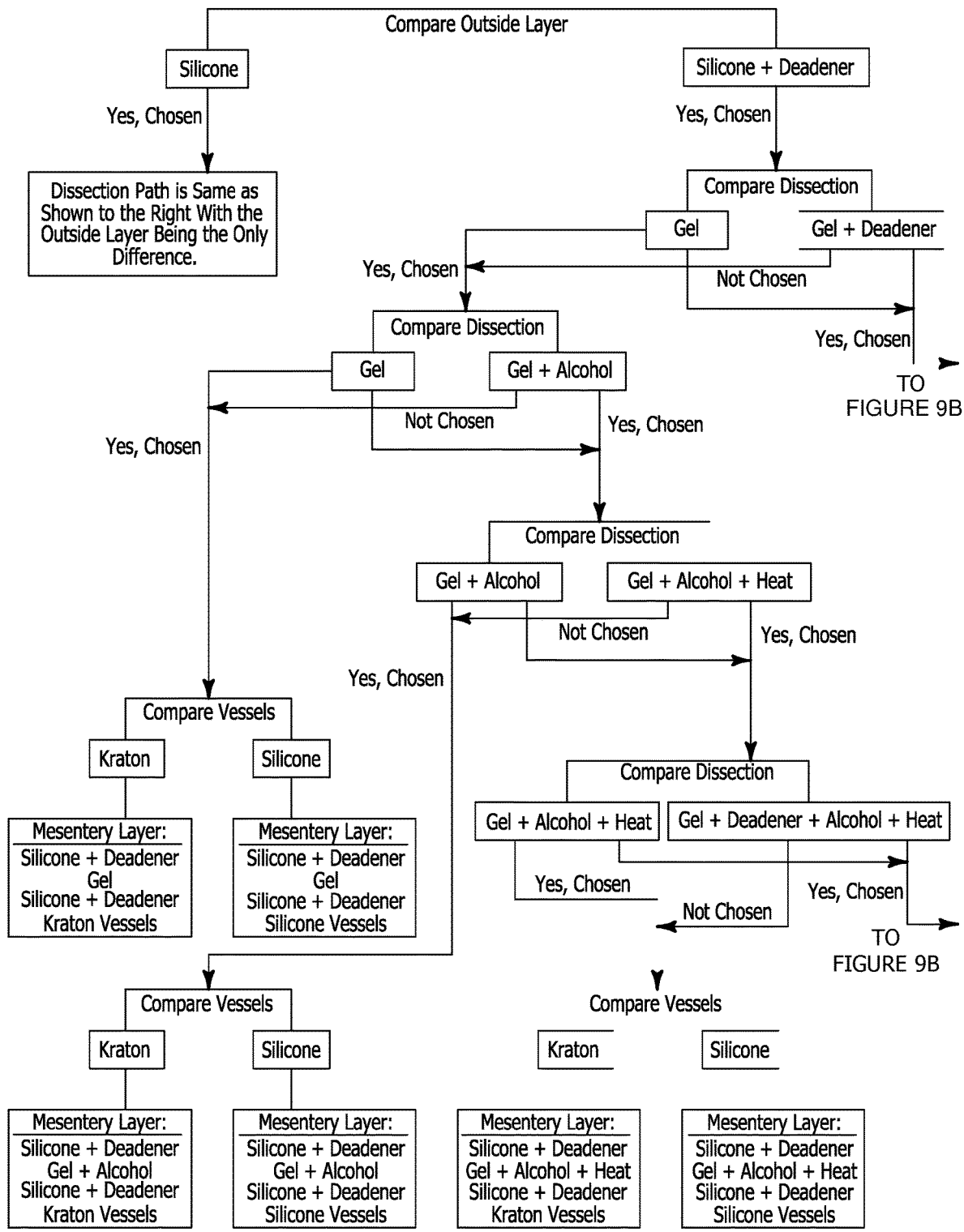
FIGS. 9A-9B is a flow-chart of composition variations for a simulated tissue structure such as a mesentery layer according to the present invention.
Figure 9B:
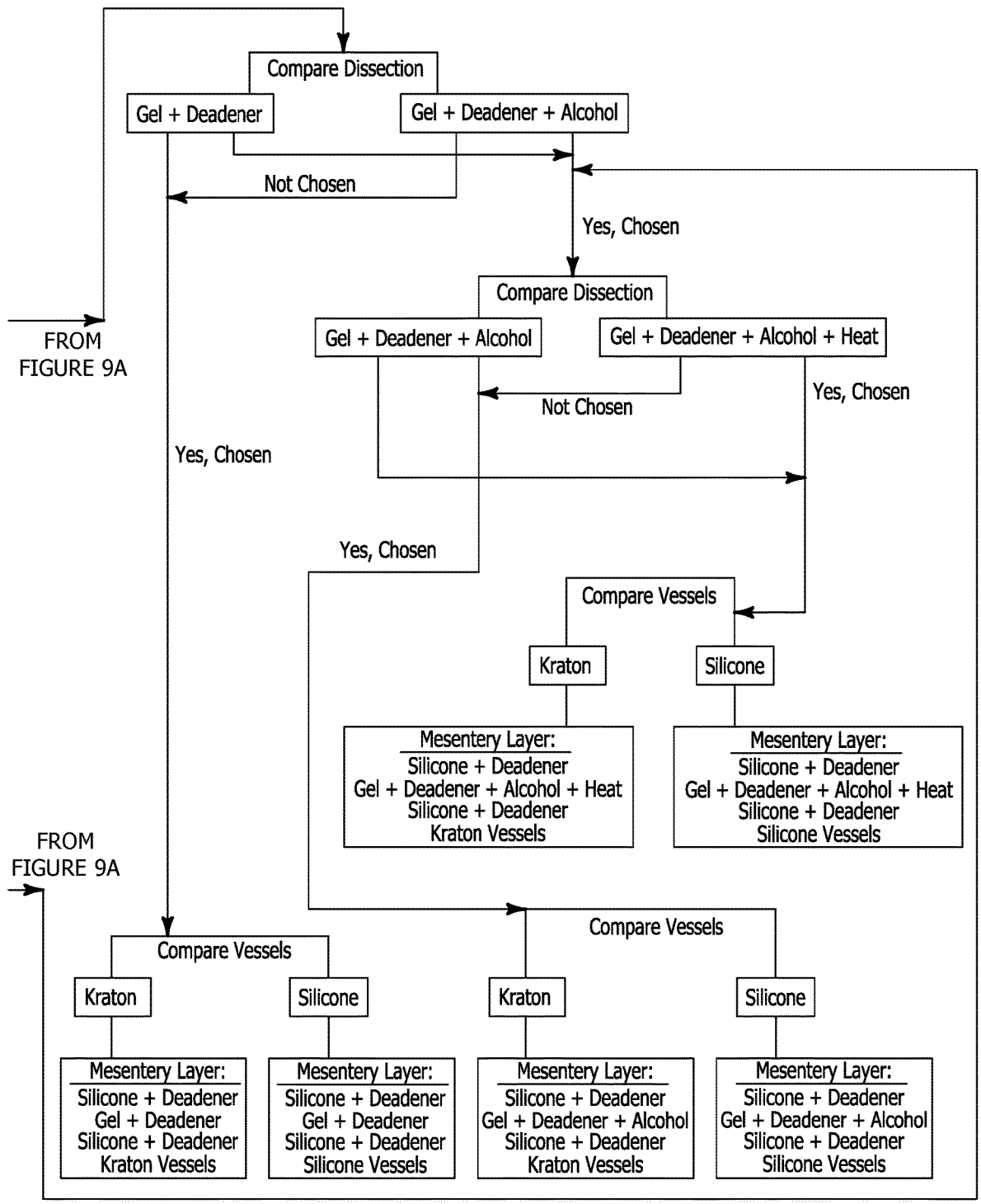
Figure 10A:
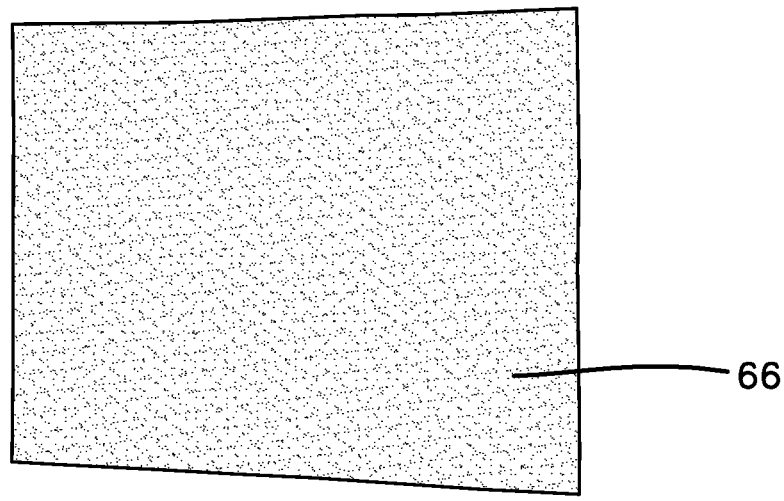
FIG. 10A is a top view of a first layer of a simulated dissectible tissue according to the present invention.
Figure 10B:
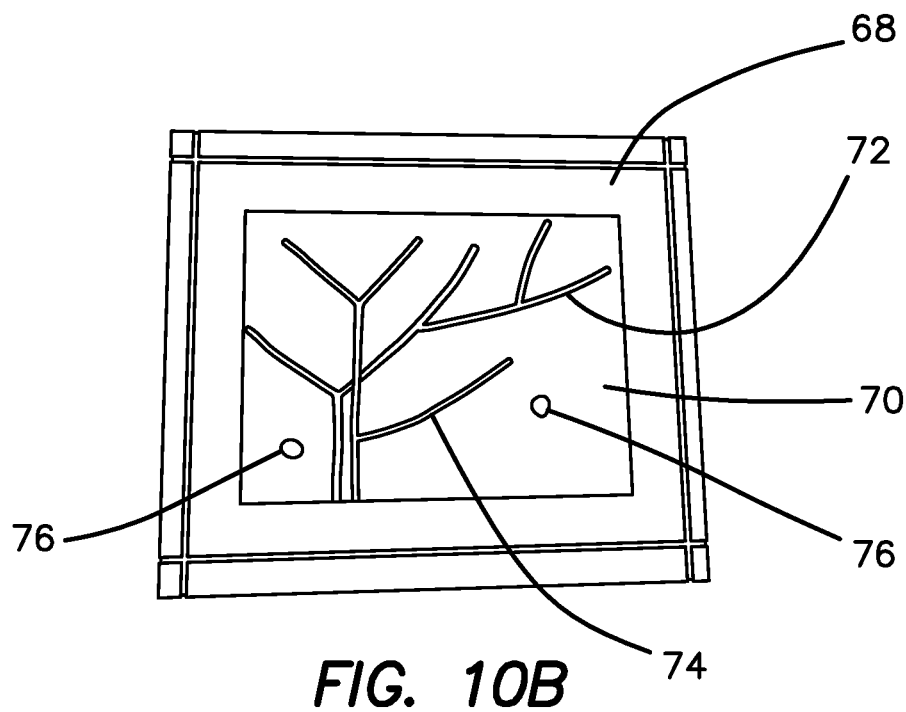
FIG. 10B is a top view of a mold and template for manufacturing a simulated dissectible tissue according to the present invention.
Figure 10C:
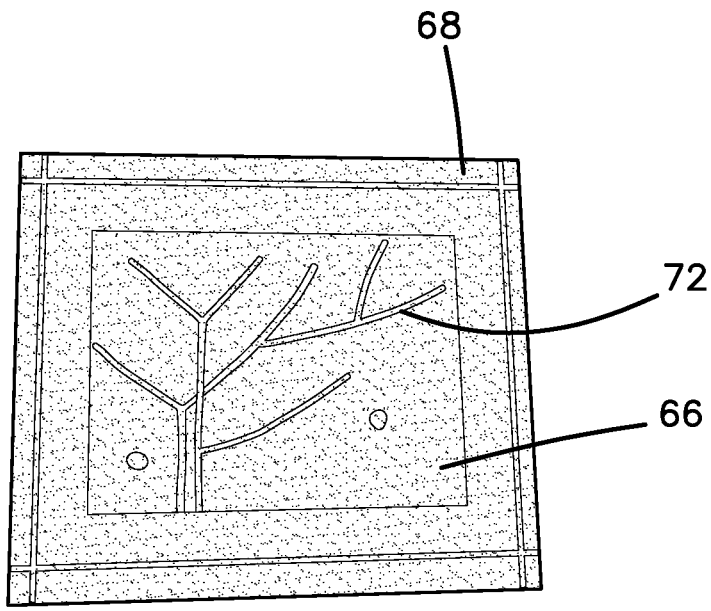
FIG. 10C is a top view of a first layer of a simulated dissectible tissue on top of a mold and template according to the present invention.
Figure 10D:
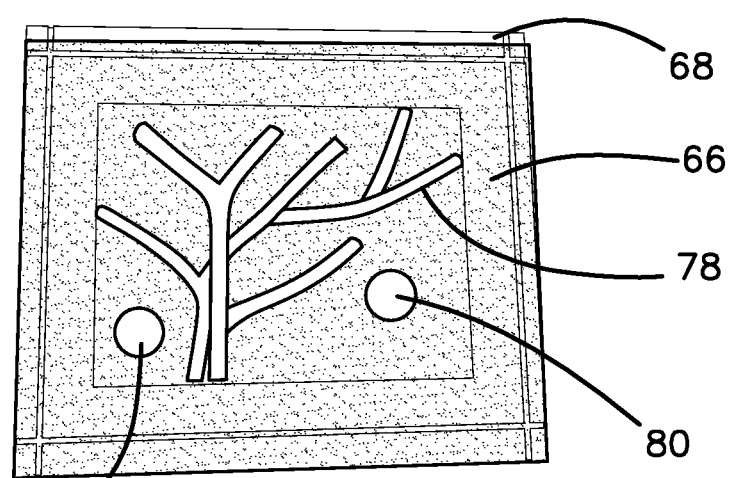
FIG. 10D is a top view of simulated vasculature and simulated tumors on top of a first layer, a template and mold according to the present invention.
Figure 10E:
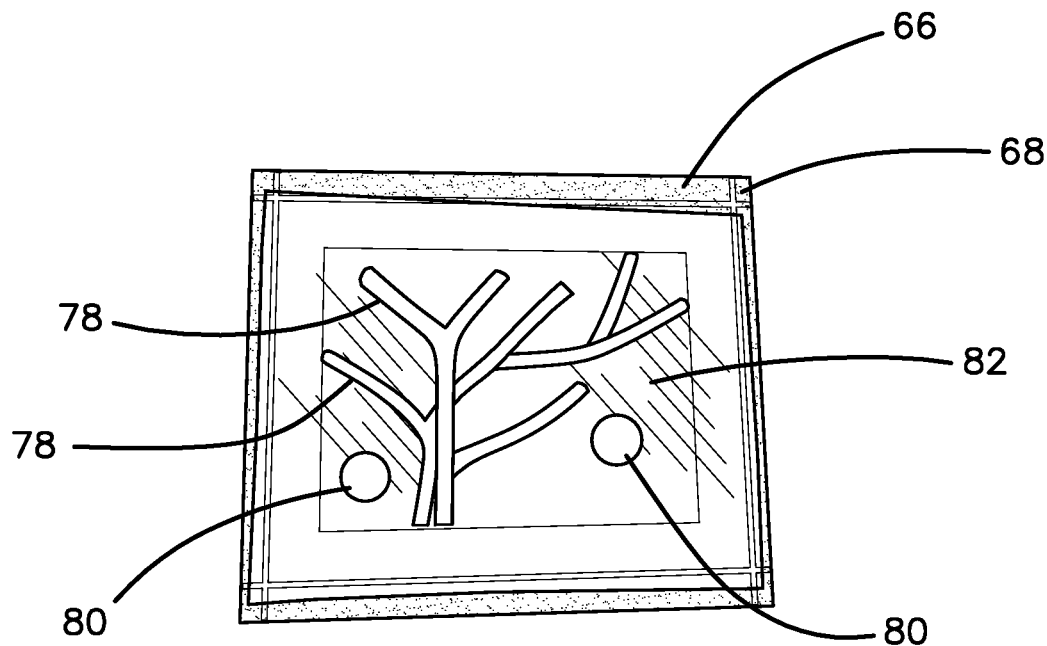
FIG. 10E is a top view of a gel second layer on top of the simulated vasculature, simulated tumors, first layer, template and mold according to the present invention.
Figure 10F:
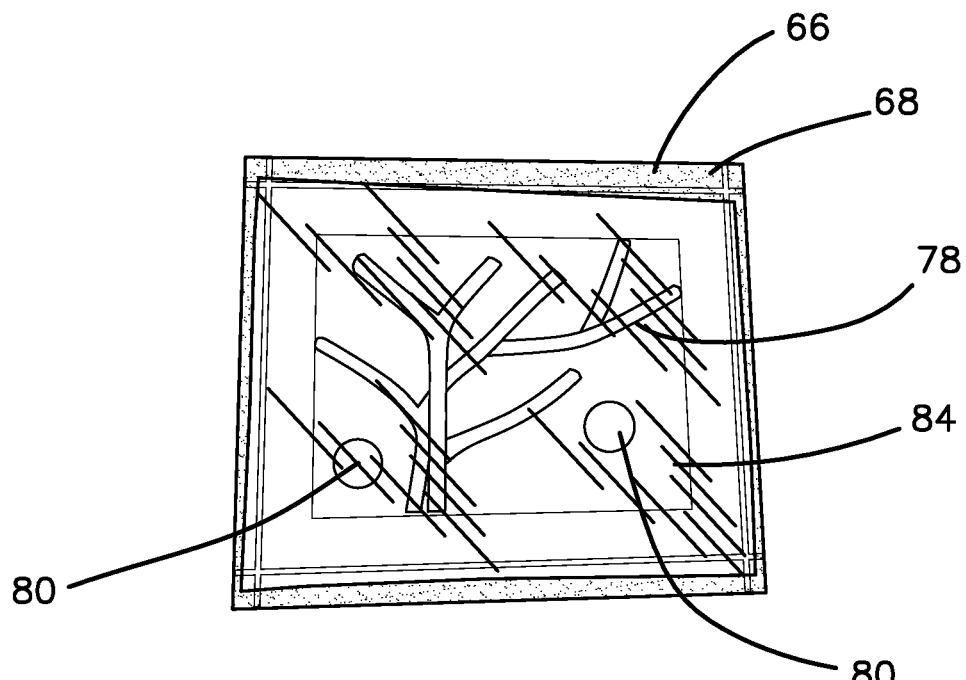
FIG. 10F is a top view of a third layer on top of a gel second layer, simulated vasculature, simulated tumors, first layer, template and mold according to the present invention.
Figure 10G:
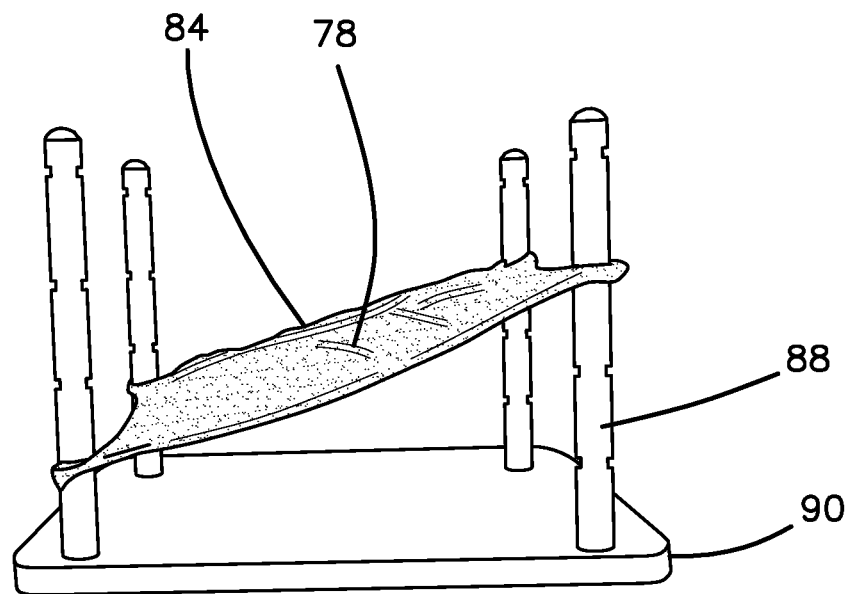
FIG. 10G is a top perspective view of a model of simulated dissectible tissue mounted on pegs of a simulated tissue platform according to the present invention.
Figure 10H:
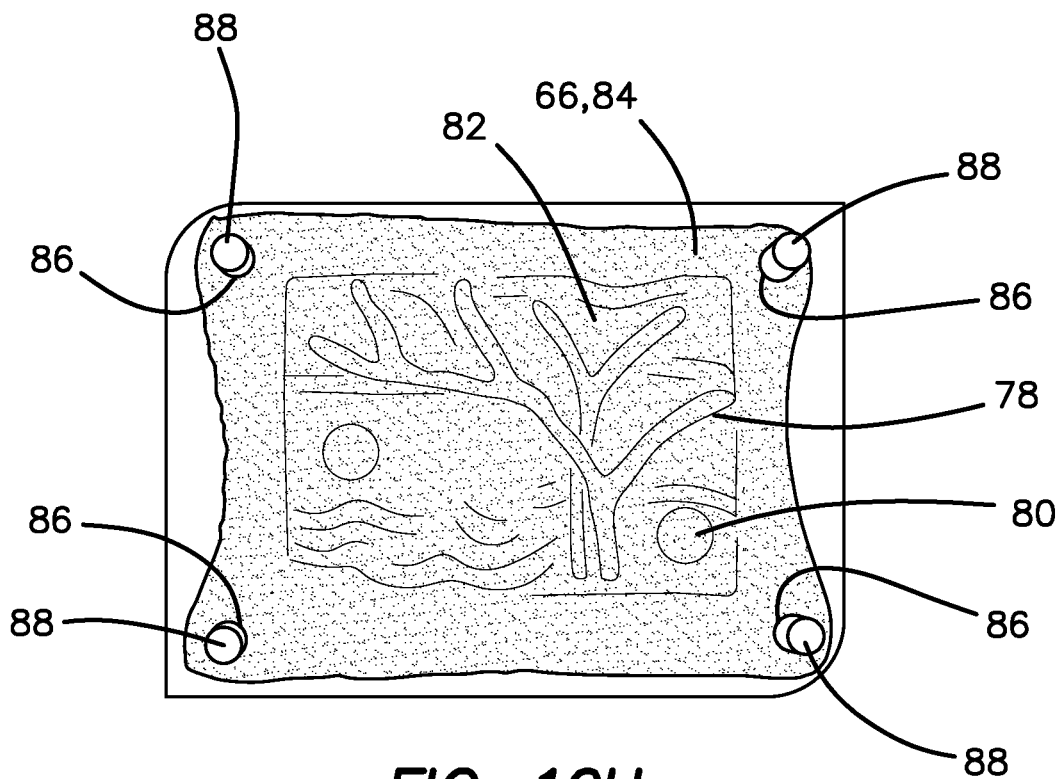
FIG. 10H is a top view of a model of simulated dissectible tissue mounted on pegs of a simulated tissue platform according to the present invention.

Through the process of fabricating the simulated dissectible tissue 47, several additives were introduced which resulted in various desirable characteristics and iterations of the simulated dissectible tissue 47. A list of the various compositions for the outside first and second layers 48, 50 and the inner or middle layer 54 of the dissectible mesentery layer 46 is shown in Table 2 and summarized in the flow chart of FIGS. 8A and 8B. A flow chart for determining the best dissectible sheet based on desirable characteristics of FIGS. 8A-8B is shown in FIGS. 9A-9B. In FIGS. 9A-9B, the mesentery layer is used as an exemplary application for the simulated dissectible tissue according to the present invention and the chart in FIGS. 9A-9B is not limited to use for making a simulated mesentery layer alone but may include use in any simulated tissue structure. Also, the mention of vessels is in FIGS. 9A-9B is not limited to simulated vessels but may include any embedded simulated anatomical structure or tissue including but not limited to tumors, pathologies, organs, ducts, cartilage and the like. The silicone outside layers 48, 50 are made with the conventional two-part 1:1 ratio room temperature vulcanizing (RTV) silicone or with the RTV silicone and a deadening agent additive at a 1:1 ratio or with the RTV silicone and a deadening agent additive at a 2:1 ratio. The RTV includes but is not limited to platinum cured room temperature vulcanization silicone (PCRTVS). The silicone deadener is within the silicone fluid chemical family, including but not limited to silicone oil, and is a platinum cured silicone additive. One example of a deadener is called SLACKER made by Smooth-On, Inc. in Macungie, Pa. The deadening agent additive makes silicone softer and more realistically similar to the feel of skin or human tissue. Silicone deadener is a silicone additive that can soften and alter the resulting "feel" as well as the rebound properties of the cured silicone. This additive is within the chemical family of silicone fluids containing silicone oils. Silicone fluids and silicone oils have a range of uses that are dependent on the viscosity and chemical structure of the fluid. A silicone deadening agent is a type of silicone oil that can be mixed with platinum-cured room temperature vulcanization silicone.

The conventional silicone used to mold the organs range from a 00-10 Shore to a 10 A Shore durometer. Thus, the addition of the deadener would result in different properties when added to silicones with different durometers. Addition of a deadening agent to a softer durometer silicone results in a gel-like composition when fully cured. However, addition of a deadening agent to higher durometer silicones results in desirable features of a softer feeling silicone that more readily approaches its fracture point of deformation when fully cured. Thus, the combination of the silicone and deadening agent can provide the tactile features of the outer layers 48, 50 such as the peritoneum layers that make up the mesentery 46.

The variations of the middle layer include: (1) gel with the deadener agent, (2) gel with alcohol, (3) gel with alcohol as well as the addition of heat, or (4) gel with the deadener agent and alcohol with heat. Isopropyl alcohol is used. The addition of each additive to the encapsulated gel layer 54 decreases the amount of pressure and force used to dissect through the layer making it easier for dissection. The gel is a platinum cured silicone rubber gel that can be used as the middle dissectible layer 54 in the mesentery assembly 46. In another variation to make the middle layer 54 easier to dissect, alcohol is added to thin the gel, thus making it easier to penetrate. Further degradation of the gel layer 54 can further enhance the ease with which the middle layer 54 can be dissected. The alcohol and gel mixture is heated to approximately 70 degrees Celsius to speed up the cure time as well as to create a porous middle layer 54 that results from the evaporation of the alcohol. The porous middle layer 54 composed of gel, alcohol and heat reduces the tack intrinsic to the gel and makes it easier to penetrate and dissect through the mesentery layers 48, 50, 54. In another variation, deadener is added to the silicone gel which results in a formulation that has a lower elastic property yet has an increased amount of tack when fully cured. In order to alleviate the issues involving the tack of the cured gel mixture, alcohol is added in equal ratios to the silicone gel and deadener mixture. The resulting property, when fully cured, has a reduced amount of tack in comparison to the sole gel mixture and the gel, deadener mixture, yet also exhibits the desirable dissectible tactile feedback when using laparoscopic dissectors. Once again this mixture can be introduced to heat to create a porous middle layer 54 with features listed above for another variation of the dissectible layer. The variations of the middle dissectible layer 54 composed of gel and the variety of additives advantageously provide the tactile feedback of moving through tissue to dissect free vessels encased between two outer layers 48, 50 within the mesentery layer 46. Furthermore, the formulated gel variations presented herein give a realistic wet-looking appearance to the layer 54 providing a shine that is particularly advantageous in laparoscopic procedures where the cavity is enclosed and illuminated with a laparoscope.

TABLE 2

Layers & Materials

| Layer | Material | Additive |
|---|---|---|
| Outside | Silicone or TPE | Deadener |
| Middle | Gel | Deadener Alcohol Alcohol & Heat Deadener & Alcohol Deadener & Alcohol & Heat |

The vasculature 44 present in the right colon model 26 is made of silicone or KRATON polymer tubes from Kraton Polymers in Houston, Tex. The vessels are encased within the simulated mesentery layer 46 that was previously described. The vasculature 44 is anatomically arranged and is adhered to peritoneum layers 48, 50 by the gel middle layer 54. Moreover, while the dissectible tissue with encased vasculature 44 was described with respect to a right hemicolectomy model, the method of manufacturing can be applied to any tissue simulation model through similar means or as a standalone model for use with the simulated tissue platform.

Another component of the right colon tray is the omentum 32. The omentum 32 is adhered over the large bowel 36 and drapes over the top of the model 26. Several variations of the omentum 32 have been developed. The first is a textured silicone cast omentum 32 that can easily drape over the top of the model 26. However, in order to simulate the heaviness and the feel of the omentum 32, it can also be cast using soft silicone foam. The omentum 32 made of foam is colored yellow and appears to take more space within the abdominal cavity, yet is still able to drape over the top of the model 26. Vasculature 34 is present on both variations of the omentum 32 in order to simulate its appearance as it is seen within the body.

With reference back to FIG. 3, the presence of adhesions 64 on the model that connect the ascending colon 60 to the abdominal wall 62 is an important feature for right hemicolectomy procedural training. In order to address the abdominal wall 62, several iterations have arisen. The first iteration of the abdominal wall 62 is made by attaching a long thin piece of foam that is about two inches in height to the side of the base 28 which can also be made of foam. The abdominal side wall 62 can also be built into the base 28 through the curvature of the formed bases and sidewalls described previously. Lastly, the abdominal side wall 62 can be made of a curved rigid hard cast material that extends to the length of the foam base 28 and is adhered to the foam base 28. The lateral adhesions 64 can be attached to the any of the described abdominal walls 62. The lateral adhesions 64 are made by using two textured silicone sheets that adhere to the top of any of the described abdominal walls 62. Between the two sheets adhered to the abdominal wall 62, is the White Line of Toldt. There are several models for the White Line of Toldt. The first iteration simulates the White Line of Toldt with rope fibers. Strands of white cotton rope are used in the model 26 to resemble the appearance of the vasculature plane of the White Line of Toldt. The White Line of Toldt can also be simulated by creating a white strip of silicone in order to represent the anatomical landmark. The White Line of Toldt is adhered between the two layers of silicone sheet and then the layers are adhered to each other along the edges and then adhered onto the ascending colon 60. The resulting structure would be lateral adhesions that connect the bowel 36 to the abdominal side wall 62.

In another aspect of the invention, the simulated dissectible tissue 47 is composed of at least two different layers. The first layer is composed of a silicone layer and the second layer is composed of a silicone gel. The simulated dissectible tissue 47 can be used to create synthetic tissue and organ models that have a close anatomical resemblance and can be used as simulation training models used for training dissection and other surgical procedures. The simulated dissectible tissue 47 according to the present invention is an assembly that is composed of at least one outer silicone layer and a gel layer encapsulated by the one or more outer silicone layer resulting in a structure that closely resemble dissection observed by surgeons. The one or more outer silicone layers of the simulated dissectible tissue is made from a two-part RTV 10 A durometer silicone mixed with a silicone deadener at 33% of the total weight, leading to a 2:1 ratio of the total silicone used to deadener. The deadener is a silicone oil that softens the properties of the curing silicone it is added too. Consequently, a 10 A durometer silicone to which a deadener is added will cure to be less than a 10 A durometer silicone. The amount of deadener added is proportional to the changes in properties of durometer to which it is added to. Silicone pigment is added to the silicone and deadener mixture, creating a viscous mixture with a pigment that corresponds to the anatomy that the silicone will be cast to represent. The silicone mixture is cast onto a sheet of foam optionally containing texture or onto a sheet containing texture made of a plaster material. The cast silicone mixture is allowed to cure in room temperature for approximately 45 minutes if foam is used or within an oven at approximately 70° C. for approximately 25 minutes if foam is not sued. The sheet size can have varying length and width depending on the size of the plane or surface that is being dissected.

Once cured, the silicone sheet is placed onto a mold containing a rectangular cavity, which is smaller than the size of the silicone sheet. The silicone sheet is placed on the mold so that the central area of the sheet is placed within the cavity and the outer perimeter of the sheet is lays flat on the surface of the mold. Having this set up configuration will facilitate the gel encapsulation process with minimal leaking of the gel. Within the central cavity, silicone vasculature and pathologies such as tumors are adhered using silicone adhesive on the section of the sheet that is within the cavity. The arrangement of the vasculature and pathology are similar to anatomical tissue where dissection is typically performed. When the silicone adhesive has cured and the vasculature and pathologies are intact, the middle gel layer is created.

The invention is not limited to embedding vasculature but may include other anatomical landmarks and structures including but not limited to vasculature, tumors, pathologies, organs and tissue structures and the material from which these are fabricated include but are not limited to any polymer material, silicone, KRATON and the like.

In one variation, the encapsulated gel present in the simulated dissectible tissue is composed of a silicone gel, a deadener, and isopropyl alcohol. To create the gel, the two part silicone gel is added to a mixing cup at equal parts of weight and volume. The deadener is added at an equal volume amount of the total silicone added. Isopropyl alcohol is added at an equal volume amount as the deadener. The mixture is mixed until a homogenous solution is created. Silicone pigment can be added as necessary to create the pigment that closely resembles human tissue that is being dissected. Once the solution is thoroughly mixed, it is cast on top of the outer silicone sheet that is placed within the cavity of the mold to create a gel layer. The gel is contained and not allowed to pass the top of cavity as that will lead to leaking of the gel and would be detrimental to the overall tissue model. Silicone gel is a silicone elastomer. It is a platinum cured silicone rubber that is extremely soft. The durometer of silicone gel falls below the Shore 00 hardness scale causing the gel-like properties of softness, tackiness and low tear resistance. An example of the gel used for the dissectible tissue is ECOFLEX gel which is manufactured by Smooth-On and has a hardness of 000-35.

At this point of manufacture, there are two distinct methods of completing a simulated dissectible tissue model. For example, the simulated dissectible tissue can be consumed as a component within an organ tray that is focused on training a surgical procedure as described with respect to FIGS. 1-6. In such a case, when the simulated dissectible tissue is consumed as a component within a tray, a second silicone sheet with the same size and composition of silicone, deadener, and pigment as the first silicone sheet is used to encapsulate the gel layer. The second silicone sheet is placed over the first sheet that contains the gel. The layers are pressed so that any air pockets are pushed to the sides of the sheets and are released to the atmosphere. Silicone adhesive is used to line the perimeter of the cavity in between the two silicone sheets in order to create a seal in between the two silicone layers and prevent leaking of the gel. The gel is allowed to cure at room temperature in between the two silicone sheets. Once cured, the simulated dissectible tissue can be removed from the casting mold. The perimeters of the silicone sheets can be used to adhere the simulated dissectible tissue to various silicone organs within an organ tray. The simulated dissectible tissue 47 can be created specifically for a simulated organ training tray that trains for a right hemicolectomy procedure as shown in FIGS. 2-6.

In another example, the simulated dissectible tissue 46 can be utilized on a smaller platform in order to solely train on the skill of dissection. In this case, once the gel layer is cast into the cavity, it is cured in an oven at approximately 60° C. for approximately 35 minutes. When the gel is cured, a 10 A durometer silicone mixture is prepared with the same pigment as the outer silicone sheet of the simulated dissectible tissue. To form the second silicone sheet layer, the silicone mixture is cast over the gel and outer silicone sheet layer and then cured for approximately 30 minutes in an oven at approximately 60° C. The resulting simulated dissectible tissue model is a standalone model that can be used to practice the skill of dissection. This iteration of the simulated dissectible tissue is a one sided model, where only one of the outer layer is a softer silicone that has a similar properties of human tissue. The outer layer constructed out of the 10 A durometer silicone serves are taut support for the model when placed in suture platform such as the kind described in U.S. patent application entitled "Surgical training model for laparoscopic procedures" bearing Ser. No. 14/037,005 and filed on Sep. 25, 2012 which is incorporated herein by reference in its entirety.

The deadening agent additive that is added while fabricating the outer silicone layer causes the cured silicone to be softer and more realistic to the feel of skin or human tissue. The addition of the deadener results in different properties when added to silicones with different durometers. Addition of a deadening agent to a softer durometer silicone results in a gel like composition when fully cured. However, addition of a deadening agent to higher durometer silicones results in desirable features of a softer feeling silicone that more readily approaches its fracture point of deformation when fully cured. Thus, the combination of the silicone and the deadening agent can provide the tactile features of the human tissue such as outer peritoneum layers that make up the mesentery.

The middle gel layer includes the gel with the deadener as well as the addition of alcohol and heat. The addition of each additive to the encapsulated gel layer decreases the amount of pressure and force used to dissect through, making it easier for dissection. The gel is a platinum cured silicone rubber gel that can be used as the middle dissectible layer in the simulated dissectible tissue. Alcohol is added to thin the gel, making the middle layer easier to dissect and easier to penetrate through. Moreover, degradation of the gel layer can further enhance the dissectible properties of the middle layer. The alcohol and gel mixture is heated to speed up the cure time as well as to create a porous middle layer through the evaporation of the alcohol. The porous middle layer composed of gel and alcohol reduces the tack intrinsic to the gel and makes it easier to penetrate and dissect through the encapsulated gel layer. In another variation, deadener is added to the silicone gel which results in a formulation that has a lower elastic property yet an increased amount of tack when fully cured. In order to alleviate the issues involving the tack of the cured gel mixture, alcohol is added in equal ratios to the silicone gel and deadener mixture. The resulting property, when fully cured, has a reduced amount of tack in comparison to the sole gel mixture and the gel, deadener mixture, yet also exhibits the desirable dissectible tactile feedback when using laparoscopic dissectors. Once again this mixture can be introduced to heat to create a porous middle layer with features listed above for another variation of the dissectible layer. The construction of the middle dissectible layer composed of gel and the variety of additives can give the tactile feedback of moving through tissue to dissect free vessels encased within the mesentery layer or other tissue structure or organ. Furthermore, the use of the shine of the gel gives a realistic wet looking appearance as in real tissue and is especially useful when viewed on a video monitor in the training of laparoscopic skills.

Variations in fabricating the outer silicone layer include changing the durometer of the silicone. RTV platinum cured silicones that are useful for creating simulated organ models include a 00-10 durometer and a 10 A durometer and the silicone outer layer can be fabricated using either silicone. Additionally, a deadener can be added to the silicone to soften the cured form of the silicone. The change in softness and elasticity of the silicone is directly proportional to the amount of deadener added. FIG. 8a shows a flow chart of outer silicone layers that form the simulated dissectible tissue.

The middle gel layer consists of a base silicone gel with additives including deadener, alcohol, and heat application to cure. Eliminating each of additives separately will give variations at each step and result in properties for each configuration. FIG. 8B shows the variation of each gel layer composition with additives at a specific ratio and the properties they exhibit. Throughout this specification for all embodiments, the ratios for the outer layer can be by volume or by weight since the densities of the silicone and deadener are almost equivalent. The ratio for the gel layer to deadener to alcohol is by volume.

Figure 7D:
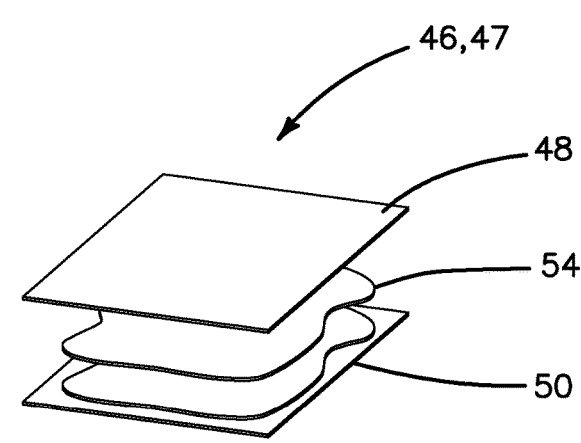
Figure 7E:
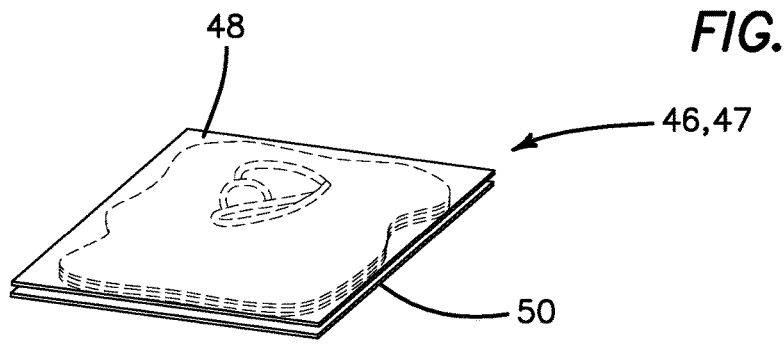

Variation in the assembly of a simulated dissectible mesentery layer can include the use of the silicone gel to adhere vasculature. The construction of this assembly involves the initial step of creating two separate thin sheets of silicone containing deadener and letting them fully cure as shown in FIG. 7A. When the sheets are fully cured, a thin layer 58*a*, 58*b* of silicone gel is spread, using a spatula or a similar tool, on the untextured side of the each of the silicone sheets 48, 50 as shown in FIG. 7B. Vasculature 44 made of silicone vessels is laid over the uncured gel layer 58*a* on one of the sheets as shown in FIG. 7C. The silicone sheets 48, 50 with the gel layers 58*a*, 58*b* are then allowed to fully cure. When the gel lining layers are cured, a fresh silicone gel 54 is prepared and poured over the silicone sheet 48 that has the silicone vessels 44 laid out. The gel 54 is spread to completely cover the vessels 44 as shown in FIG. 7D. The second silicone sheet 50 is then laid over the uncured gel and air pockets are pushed out of to the edges. The result of this process is a multi-layered mesentery that can be compatible with laparoscopic dissection as shown in FIG. 7E.

The simulated dissectible tissue of the present invention has mechanical properties of low tear resistance, elasticity, toughness, color, and texture of typical tissue that is dissected. Laparoscopic tools such as Maryland dissectors or laparoscopic scissors can be used within this tissue in order to dissect or cut through the tissue, respectively. The dissectible tissue use of gel creates a unique shine to the material allowing it have a realistic wet appearance. Since the gel used to construct this dissectible tissue is silicone based, it can be bonded to various other silicone models or organs that are already manufactured such as silicone vessels. Moreover, the tackiness of the gel enables the vessels made of other thermoplastic elastomers such as KRATON polymer to be adhered on to the outer silicone layers with the silicone gel.

The simulated dissectible tissue of the present invention is capable of being dissected and has several advantageous characteristics, which closely resemble human tissue. The simulated tissue emulates the mechanical properties of human tissue such as elasticity, toughness, color, and texture. Also, the tear resistance or tear strength of the simulated tissue is low and advantageously allows propagation of tissue separation. Low tear resistance of the simulated tissue facilitates blunt dissection using laparoscopic Maryland dissectors or laparoscopic scissors with minimal force. The simulated tissue also provides for the inclusion of anatomical landmarks or anatomical structures of typical anatomy that requires dissection. These anatomical landmarks or structures include but are not limited to peritoneum sheets that surround organs, vasculature embedded in between mesentery layers, or pathologies such as tumors that need to be resected. The anatomical landmarks or structures are able to be grasped using atraumatic laparoscopic graspers or Maryland dissectors or cut using laparoscopic scissors. Additionally, the simulated dissectible tissue of the present invention allows for manipulation and maneuvering of anatomical structures upon completion of dissection. The movement of the structures closely resembles the movement of anatomical structures of human tissue when dissection is completed. Additionally, the simulated dissectible tissue is capable of being manufactured consistently. The simulated tissue is moldable to take the shape of the human organs or membranes. The simulated dissectible tissue also is bondable with a variety of silicones and thermoplastics. Any and all of the silicone layers in the present invention may be translucent or transparent such that the underlying embedded pathologies, tumors, vasculature and the like may be slightly visible through one or more of the layers.

Example

Figure 11:
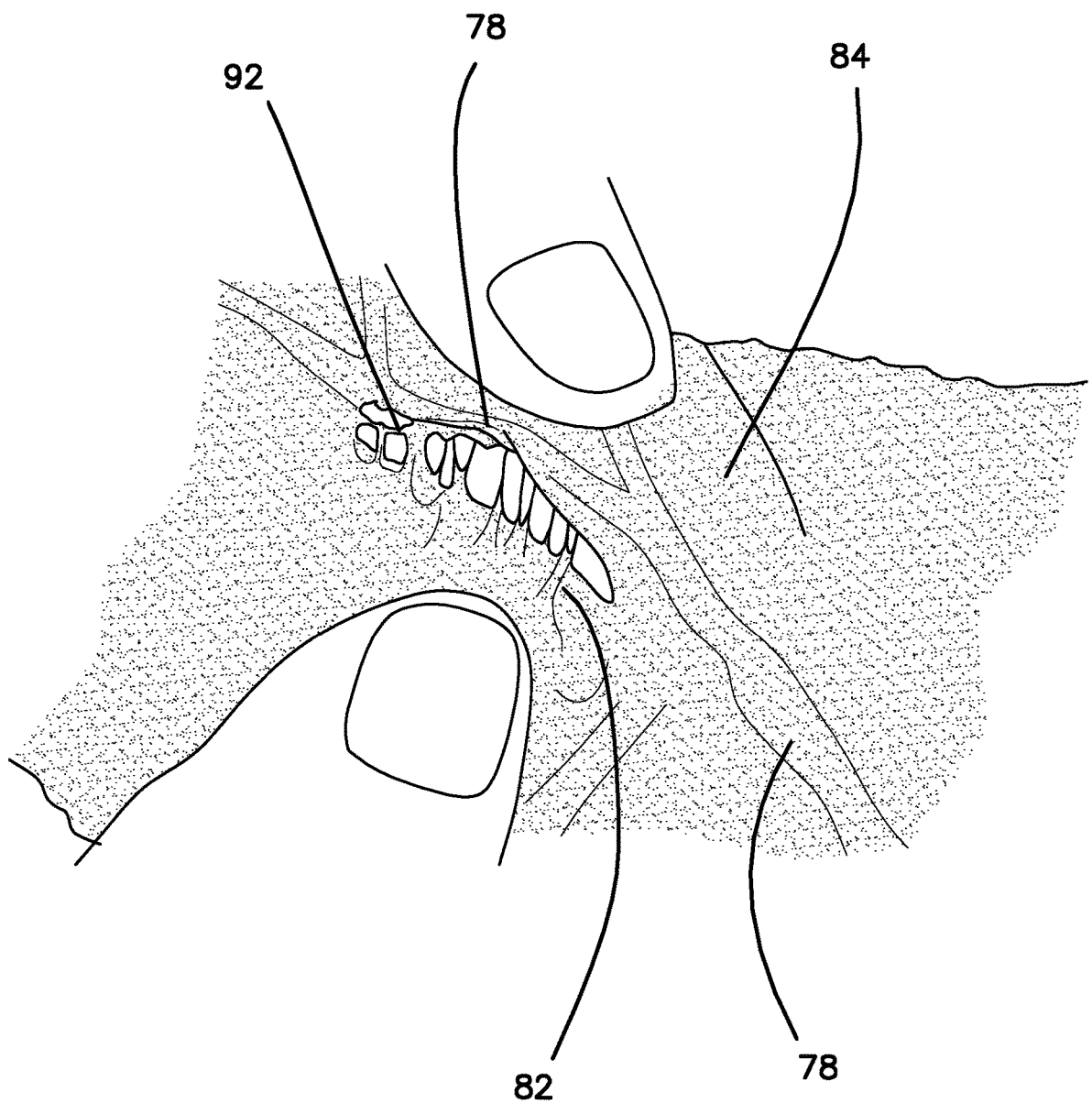
FIG. 11 is a top perspective view of a simulated dissectible tissue with an incision in an outer layer exposing an inner gel layer according to the present invention.

With reference to FIGS. 9A-9H, an example of manufacturing a simulated tissue model having a composition of a simulated dissectible tissue will now described. A 10 A durometer silicone comprising two parts, parts A and B, is provided. Approximately 5 grams of part A of the 10 A durometer silicone is mixed with approximately 5 grams of part B of the 10 A durometer silicone. Approximately 5 grams of a silicone deadener is added. Yellow silicone pigment is added. The silicone, deadener and pigment are thoroughly mixed. The mixture is cast onto a textured mold and allowed to cure to form a first layer sheet 66 as shown in FIG. 9A. A rectangular mold 68 having a central cavity 70 of a depth of approximately 0.125 inches is provided as shown in FIG. 9B. The depth of the central cavity 70 can be modified depending on the dissectible thickness desired. A vasculature template 72 is placed into the rectangular mold inside the central cavity as shown in FIG. 9B. The template 72 depicts lines 74 where silicone vessels should be placed for correct anatomy. The template 72 also includes depictions of anatomical locations 76 of where certain pathologies should be placed. Although a vasculature template 72 is disclosed the invention is not so limited and a template 72 of any anatomical feature may be employed directing where certain structures, pathologies, organs, tumors and other tissue and anatomical landmarks should be placed. The first layer sheet 66 is then placed over the mold 68 such that it is aligned with the outer edges of the mold 68 as shown in FIG. 9C. The first layer sheet 66 is transparent such that the template 72 is visible through the first layer sheet 66. Next, as shown in FIG. 9D, simulated vasculature 78 and simulated tumors 80 are adhered to the first silicone sheet layer 66 using silicone adhesive and in the locations shown on the template 72 that was placed underneath. The simulated vasculature 78 is placed over the lines 74 of the template 72. The lines 74 or other shapes on the template 72 may be further color-coded such that the correspondingly colored vessels and/or organs are placed in the correct anatomical locations. Approximately 3.3 grams of part A silicone gel is mixed with approximately 3.3 grams of part B silicone gel. Approximately 6.67 milliliters of silicone deadener and 5.27 grams of isopropyl alcohol are added to the silicone gel and mixed together. Volumetrically, these amounts would be approximately 3.3 milliliters of part A of silicone gel, mixed with approximately 3.3 milliliters of part B silicone gel, 6.67 milliliters of silicone deadener and 6.67 milliliters of isopropyl alcohol. Yellow and white silicone pigment is added and mixed. The mixture is cast into the central cavity to surround the simulated vasculature 78 but not leak over the cavity to create the middle gel layer 82 as shown in FIG. 9E. All of the components are cured in an oven at approximately 60 degrees Celsius for approximately 35 minutes. The middle gel layer 82 is also transparent when cured such that the simulated vessels 78 and simulated tumor 80 are visible through the middle gel layer 82. Approximately 35 grams of part A and 35 grams of part B of a 10 A durometer silicone are mixed. The silicone is cast over the cured gel and the side surfaces of the model to create the second outer layer 84. The model is then allowed to cure in an oven at approximately 60 degrees Celsius for approximately 25 minutes. The second outer layer 84 is also transparent such that in combination of the gel layer 82 and the outer layer 84, the embedded landmarks such as the simulated tumor 80 and simulated vessels 78 are visible through the layers 66, 82, 84. Any excess perimeter of the silicone sheet sandwich is trimmed such that the dimensions of the model are approximately 4 inches by 5 inches with the middle gel layer 82 being encapsulated by the two encompassing outer layers 66, 84. The perimeter of the model is made of the two outer layers 66, 84 adhered against each other with no middle gel layer 82 therebetween in order to prevent leakage of the gel layer 84 out of the model. The outer layers 66, 84 serve to seal in and encompass the gel middle layer 84. With reference to FIGS. 9G and 9H, four holes 86 in the corners of the rectangular model are punched and the model is placed over the upstanding pegs 88 of a simulated tissue platform 90 and suspended in trampoline-like fashion so that the dissection may be practiced. The simulated tissue model of FIGS. 9A-9H is that of the vasculature near the gallbladder and may be considered a partial gallbladder model and may or may not include a simulated gallblader. In use, the model is suspended on the platform 90 or made part of a larger organ model or organ tray and placed in a surgical simulator and/or trainer for the practitioner to train surgical procedures on the model. The model may also be used outside of a simulator and/or trainer. With additional reference to FIG. 11, the practitioner will incise into the second outer layer 84 and enter the middle gel layer 82. The practitioner will spread the second outer layer 84 apart from the first outer layer 66 to access the embedded structures, simulated vessels 78 and simulated tumors 80. In doing so, the practitioner will have to separated or dissect the middle gel layer 82. The middle gel layer 82 is soft and is glossy and elastic. When the second outer layer 84 is lifted, the soft elastic gel of the middle layer 82 advantageously resembles a fibrous membrane as it stretches when the second outer layer 84 is moved apart from the first outer layer 66. As the middle gel layer 82 stretches, it advantageously opens into deep pockets with strands 92 of gel remaining interconnected between the two layers which the surgeon will practice to cut through these strands of gel. Blunt or sharp dissection of the soft silicone gel will continue to open up the space creating a dissection plane through the middle gel layer 82 and between the first outer layer 66 and the second outer layer 84. The anterior layer can also be incised and divided to further gain visibility of the structures such as the simulated vasculature 78 embedded in the middle gel layer 82, emulating skeletonization.

Figure 15:
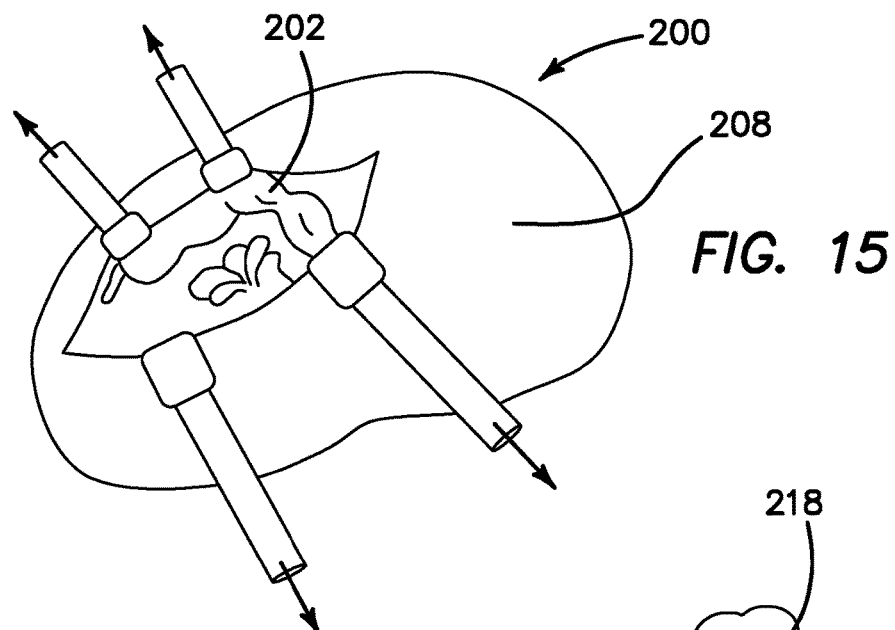
FIG. 15 is a top perspective view of an organ model with a retracted incision according to the present invention.

With reference to FIGS. 12-15, another variation of an organ model 200 of the present invention will now be described. The organ tray model 200 includes all of the features described with respect to FIGS. 2-6 that are associated with a right colon model 26 and additionally includes features of a left colon model including one or more of the following simulated anatomy: simulated spleen, simulated descending colon, simulated sigmoid colon, simulated bowel, simulated transverse colon, simulated rectum, simulated left abdominal side wall, simulated left White Line of Toldt, simulated aorta, simulated left kidney, simulated pancreas, simulated nerves, simulated Toldt's Fascia/Space between the mesentery and retroperitoneal space, simulated left ureter, simulated gonadal vessels, simulated prostate, simulated seminal vesicles, simulated urethra, simulated bladder, simulated mesorectum, simulated Denonvillier's Fascia, simulated pelvis, left interior mesenteric vein and vessel and a plastic base. The simulated anatomy 202 is supported on an optional platform 204 which is placed inside a base 206 and covered with an outer simulated skin layer 208. The platform 204 includes a plurality of holes 209 for receiving fasteners such as rivets 226 that are associated with the simulated anatomy 202 and configured to snap into the holes 209 to releasably connect the simulated anatomy 202 to the platform 204. An open procedure can be simulated with the addition of skin layer 208. An incision 211 is made in the skin layer 208 as shown in FIG. 14A which is then retracted to expose the simulated anatomy 202 as shown in FIG. 14B and FIG. 15. The model 200 permits users to practice total mesorectal excision (TME) using open or laparoscopic surgical techniques. For simulated laparoscopic surgery, the model 200 without the skin layer 208 is placed inside the cavity 18 of a trainer 10. For practicing open procedures, the legs 16 of the trainer 10 are removed and the top cover 12 is placed directing onto the base 14 to reduce the size and height of the cavity 18 with the model 200 residing between the top cover 12 and the base 14. A silicone wall insert is placed into the large aperture 20 in the top cover 12. In another variation for practicing an open procedure, the legs 16 of the trainer 10 are modified to be shorter in length and, thereby, reduce the height of the cavity 18 between the top cover 12 and the base 14. In yet another variation for practicing an open procedure, the top cover 12 of the trainer 10 is removed and a silicone sheet is placed over the model 200 that is located in the base 14. The silicone sheet 208 simulating a skin layer is also placed over the base 14 and sidewalls of the base 14 such as shown in FIG. 12.

Figure 16:
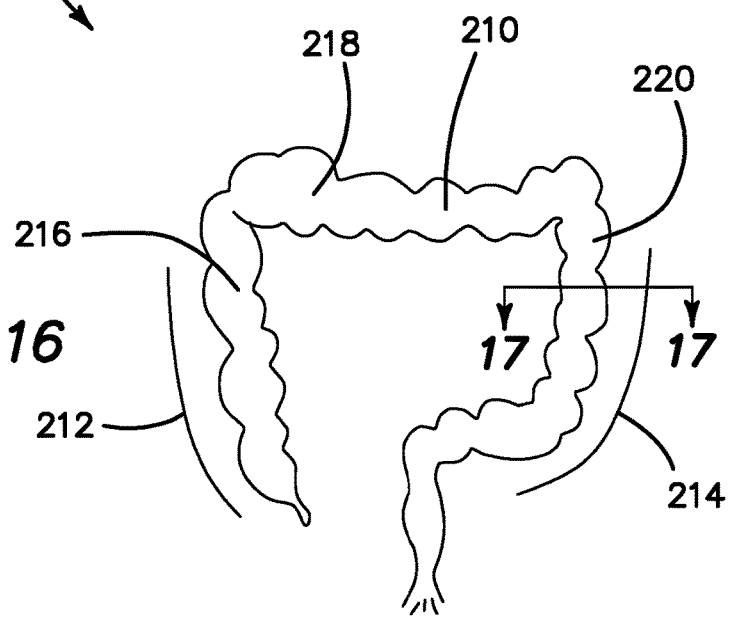
FIG. 16 is a partial schematic of an organ model according to the present invention.
Figure 17:
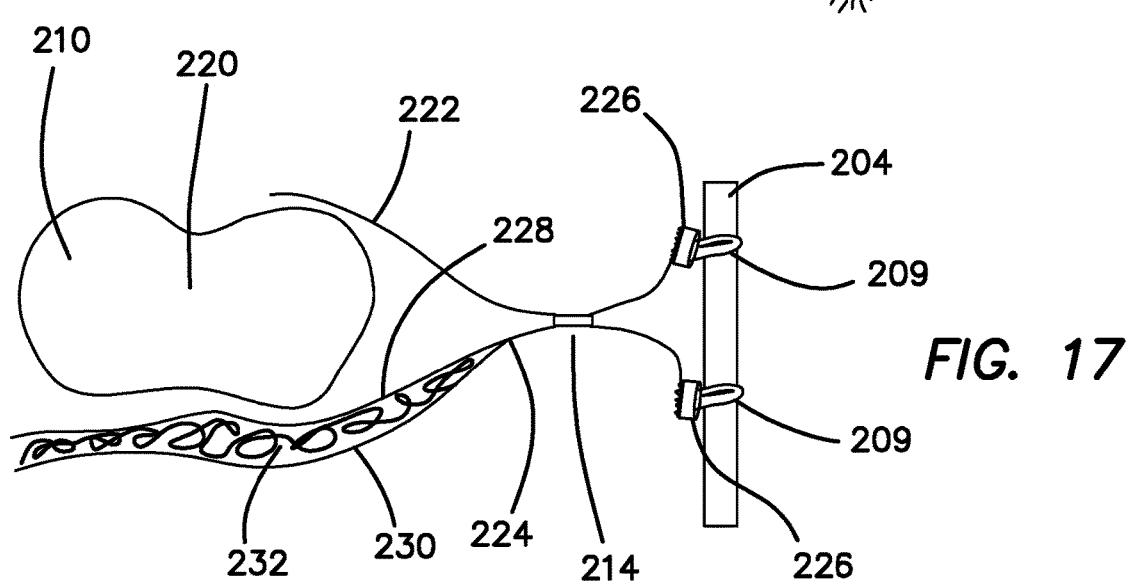
FIG. 17 is a cross-sectional view taken along line A-A of FIG. 16 of a part of an organ model according to the present invention.

Turning now to FIGS. 16 and 17, a portion of a simulated bowel 210 including a simulated ascending colon 216, simulated transverse colon 218 and a simulated descending colon 220 is shown together with a simulated right White Line of Toldt 212 and a simulated left White Line of Toldt 214. Although both the right and left simulated White Lines of Toldt, 212, 214 are shown in FIG. 16, the model 200 may include both or just one of the right or left White Line of Toldt. FIG. 17 illustrates a cross-sectional view that focuses on the left White Line of Toldt 214. The right White Line of Toldt 212 is substantially the same on the right side of the model 200. The simulated peritoneum layer 222 overlays the bowel 210 and joins the simulated mesentery layer 224 from the bottom of the bowel 210 to form the simulated left White Line of Toldt 214 and then is respectively connected to the sidewall of the platform 204 via fasteners such as rivets 226 inserted through apertures 209 in the sidewall. At least part of the simulated mesentery layer 224 comprises a first layer 228 of silicone and a second layer 230 of silicone spaced apart by a third layer 232 of polyfill fiber material to create a sandwiched layer that is described in greater detail in U.S. Provisional Patent Application Ser. No. 62/193,143 filed on Jul. 16, 2015 incorporated herein by reference in its entirety.

A layer of polyfill comprises a plurality of one or more non-aligned, randomly arranged, nonwoven fiber which may or may not be connected to one or more adjacent silicone layer at one or more location along the length of the fiber(s). The fiber is connected to one or more of the first layer and the second layer by being embedded into the one or more of the first layer and the second layer during the manufacturing process which will be described in greater detail below. Each fiber may be in the form of a strand, filament, yarn, micro-fiber and the like and has a length and at least a first end and a second end. Adhesive may or may not be used to connect the fiber. The fiber of the third layer is resident within the gap between the first layer and the second layer in a randomly arranged fashion. For example, one strand of fiber may be connected to the first layer at one location and then connected to the first layer again at another location along the length of the fiber or to the second layer and its free ends may or may not be embedded in the first or second layer. Some strands of fiber may not be connected to the first layer or second layer and are freely disposed between the first layer and the second layer. Some strands of fiber are entangled and intertwined with other strands in a loose fashion such that the strands may move relative to other strands. The fiber may span the gap to be connected to the opposite or second layer at one or more location along the length of the fiber. It is possible to use a single fiber strand instead of a plurality of fiber strands to comprise the third layer. The single fiber strand would be longer in length to fill and create a gap between the layers compared to the use of shorter strands to fill the same gap. Although the word polyfill is used throughout the specification, the composition is not limited to polyester. The fibers are selected from any suitable material such as polyester, polyamide, acrylic, acetate, polyolefin, cotton, fiberfill, batting, polyethylene terephthalate, polyethylene naphthalate, nylon, polyfill, fiberfill, polymer, plastic, spandex or other suitable fiber, natural fiber, non-absorbent fiber, synthetic fiber or fiber-like material and still be called polyfill. The material may be woven, not woven or partially woven. Fiberfill/polyfill is typically made by garnetting in which a garnet machine takes fibers and combs them into a batt form. The garnet machine may then fold and chop the fibers to make strands that are shorter and clumped together. The fibers mat together, entangle and bunch. The fiber advantageously provides a visual of glistening tissue as light is reflected in many directions from the shiny fiber mimicking wet live tissue especially when viewed on a video monitor via image capture using a laparoscope.

Figure 18A:
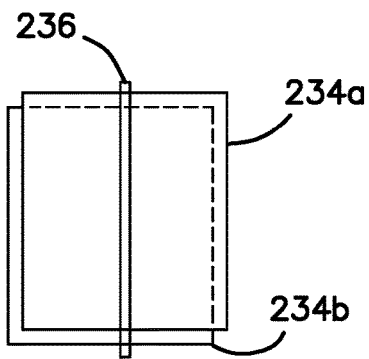
FIG. 18A is a top view of two layers of silicone in the formation of a White Line of Toldt according to the present invention.
Figure 18B:
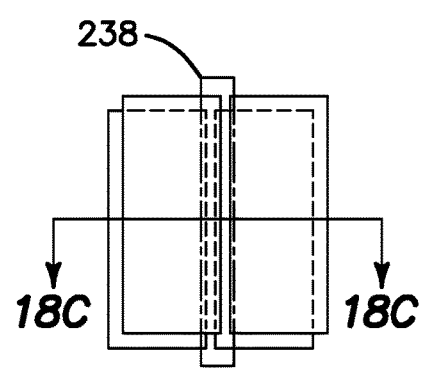
FIG. 18B is a top view of two layers of silicone connected by a white layer of silicone in the formation of a White Line of Toldt according to the present invention.
Figure 18C:
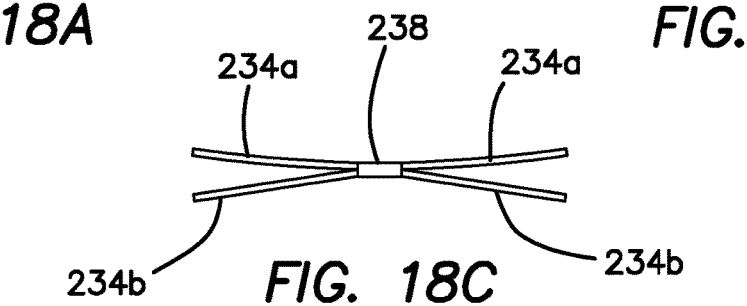
FIG. 18C is a cross-sectional view taken along line B-B of FIG. 18B of two layers of silicone and a White Line of Toldt according to the present invention.

With reference to FIGS. 18A-18C, the simulated White Line of Toldt 212, 214 is made by placing two thin layers of flat silicone 234a, 234b on top of each other as shown in FIG. 18A. The bottom layer 234b is a polyfill sandwich layer comprising a polyfill third layer 232 located between a first silicone layer 228 and a second silicone layer 230 to simulate Toldt's fascia. A narrow strip 236 is removed from both layers 234a, 234b by making two side-by-side cuts as shown in FIG. 18A. A layer 238 of white silicone simulating the White Line of Toldt is applied across the gap created by the removal of the narrow strip 236 and allowed to cure as shown in FIG. 18B. As a result of this construct, four layers comprising two of each of the first silicone layer 234a and the second silicone layer 234b are adhered by the white layer 238 of silicone as shown in FIG. 18C. The first layer 234a and second layer 234b of silicone on one side of the simulated White Line of Toldt 238 form the simulated peritoneum layer 222 and simulated mesentery 224, respectively, and are connected to the colon with adhesive and the first layer 234a and second layer 234b of silicone on the other side of the simulated White Line of Toldt 234 are attached to the sidewall of the platform 204 with fasteners such as plastic rivets 226 inserted into holes 209 in the platform 204. The layer 222 may also be attached to the sidewall on the other side near the right colon using silicone, fasteners, rivets or cyanoacrylate adhesive.

Figure 19:
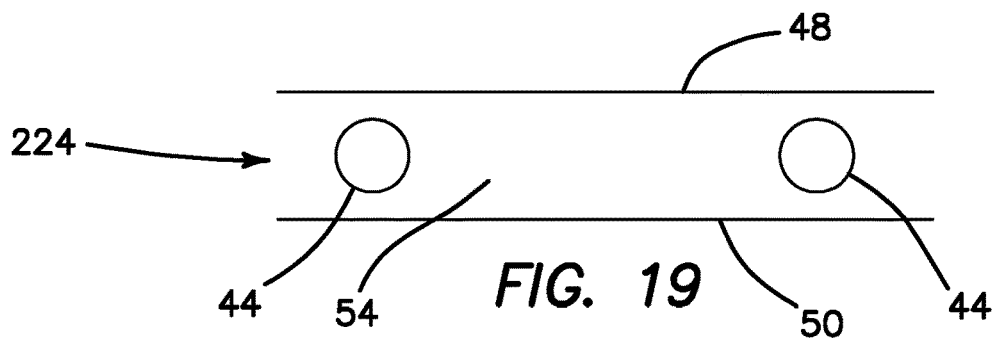
FIG. 19 is a side, cross-sectional view of a simulated mesentery layer according to the present invention.
Figure 20:
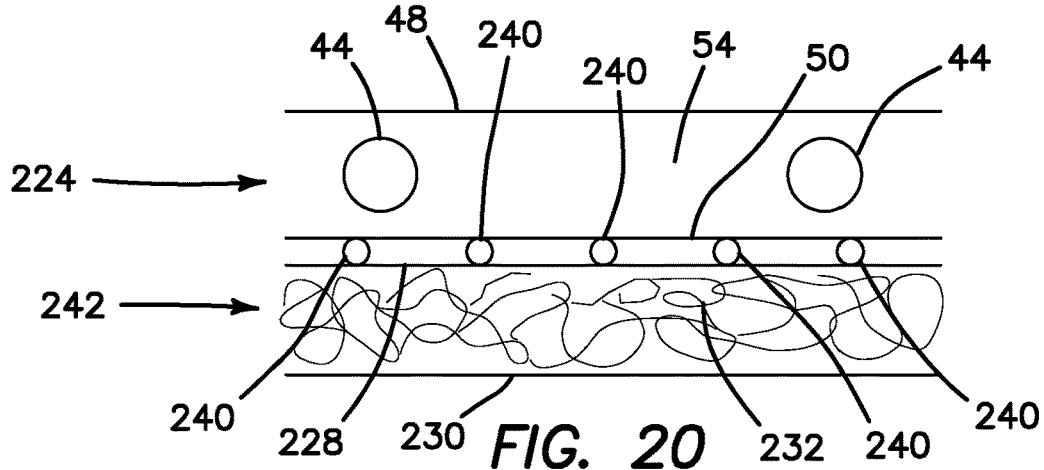
FIG. 20 is a side, cross-sectional view of a simulated mesentery layer and simulated Toldt's fascia according to the present invention.
Figure 21:
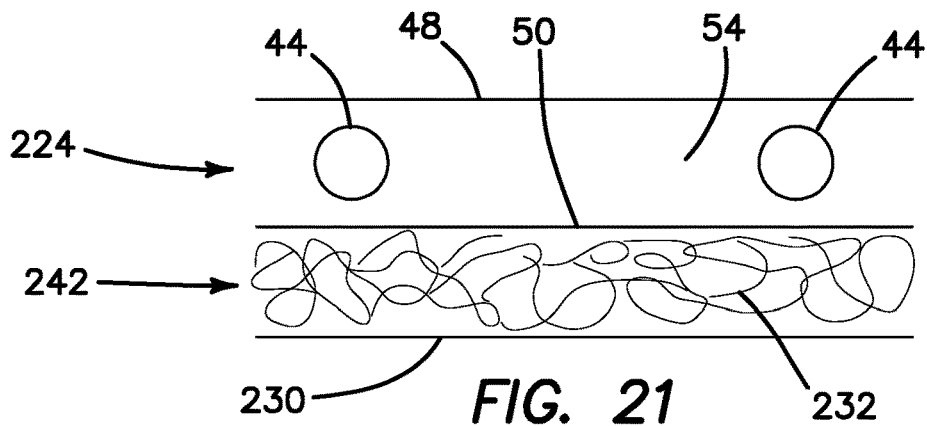
FIG. 21 is a side, cross-sectional view of a simulated mesentery layer and simulated Toldt's fascia according to the present invention.
Figure 22:
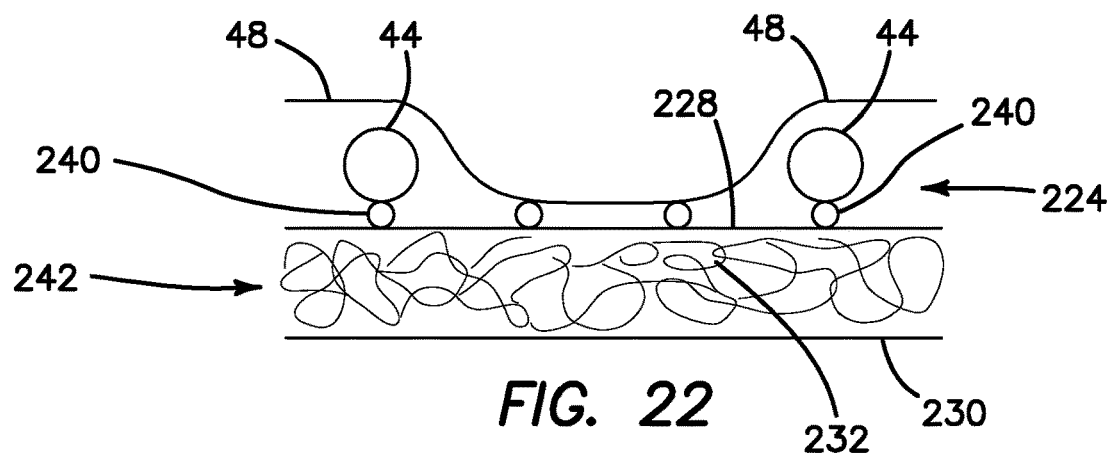
FIG. 22 is a side, cross-sectional view of a simulated mesentery layer and simulated Toldt's fascia according to the present invention.

In one variation, the simulated mesentery 224 comprises a gel sandwich of three layers: a top layer 48 of silicone, a bottom layer 50 of silicone and a middle layer 54 of gel that encapsulates simulated blood vessels 44 made of silicone and the like therebetween as described in the present specification and shown again in FIG. 19. In another variation that is shown in FIG. 20, the simulated mesentery layer 224 comprises a first layer 228 of silicone and a second layer 230 of silicone and a third layer 232 of polyfill fiber therebetween. The first layer 228 of silicone is adhered with adhesive 240 to the bottom layer 50 of silicone that together with a top layer 48 of silicone sandwiches a middle layer 54 of gel. The gel middle layer 54 may encapsulate simulated vessels 44 made of silicone. In yet another variation shown in FIG. 21, a top layer 48 of silicone and a bottom layer 50 of silicone sandwich a middle layer 54 of gel that may encapsulate simulated vessels 44 made of silicone. The bottom layer 50 together with a second layer 230 of silicone sandwich a third layer 232 of polyfill fiber therebetween. In yet another variation shown in FIG. 22, a first layer 228 of silicone together with a second layer 230 of silicone sandwiches a third layer 232 of polyfill therebetween. A top layer 48 of silicone is provided and simulated vessels 44 are located between the top layer 48 and the first layer 228. The simulated vessels 44 are adhered to the first layer 228 with adhesive 240 but are not adhered to the top layer 48. Also, the top layer 48 is adhered to the first layer 228 with adhesive 240 applied in select areas such as between simulated vessels 44 as shown in FIG. 22. No middle layer of gel is provided in this variation. In another variation, a first layer 228 and a second layer 230 of silicone is provide with a third layer 232 of polyfill provided therebetween. A top layer 48 of silicone is provided with a middle layer 54 of polyfill between the top layer 48 and the first layer 228 with simulated vessels 44 of silicone located between the top layer 48 and the first layer 228. A bottom layer 50 may also be provided between the middle layer 54 of polyfill and the first layer 228 of silicone. These variations shown in FIGS. 19-22 are variations to simulate Toldt's fascia/space between the mesentery and retroperitoneal space. This space is defined by the two silicone layers with the third layer 232 of polyfill between them. The variations of FIGS. 20-22 show the variations of Toldt's fascia 242 and the mesentery 224 combination. Within the fascia layers, simulated ureters, simulated gonadal vessels, simulated duodenum and simulated nerve bundles may be located.

Figure 23:
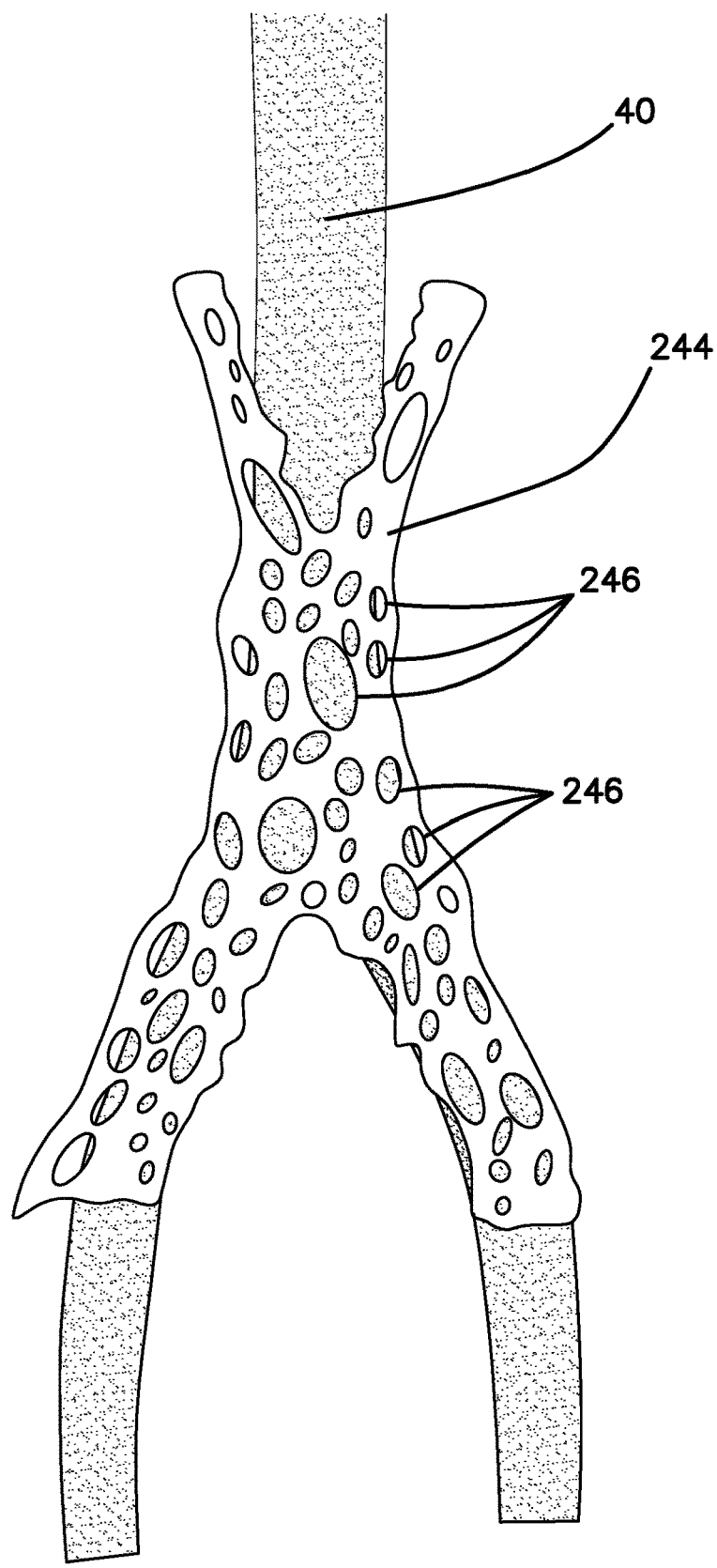
FIG. 23 is a top perspective view of a simulated aorta with a simulated nerve bundle according to the present invention.

Turning now to FIG. 23, there is shown a simulated aorta 40 preferably made of silicone that is dyed red. A simulated nerve bundle 244 made of yellow-colored silicone is provided and attached to the simulated aorta 40 as shown. The simulated nerve bundle 244 includes a plurality of openings 246. In one variation, the simulated nerve bundle 244 sits over the aorta in the space of Toldt's fascia 242 inside the polyfill area. In one variation, the simulated nerve bundle 244 is not yellow in color.

Figure 24:
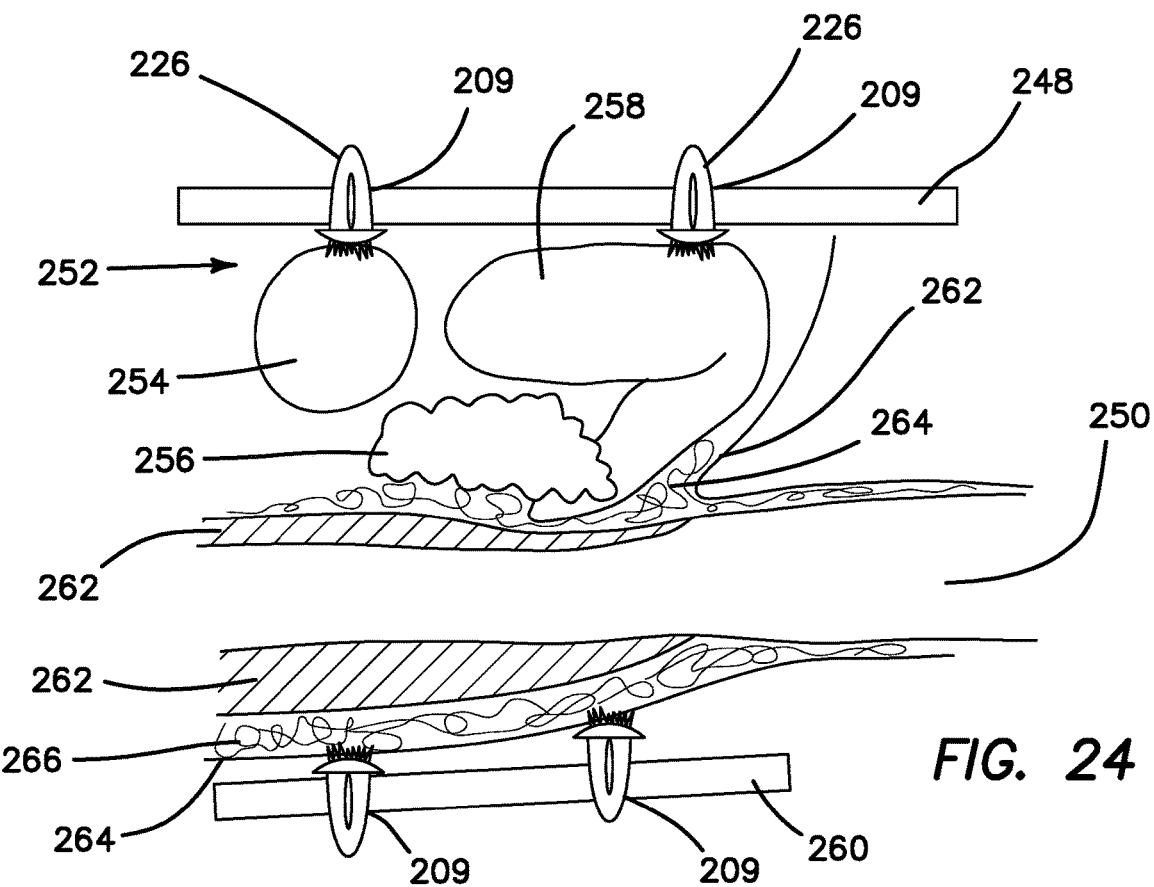
FIG. 24 is as cross-sectional view taken along the midline of a pelvic region of a model according to the present invention.

Turning now FIG. 24, the model 200 includes a lower pelvis portion. After practicing the mobilization of the right or left colon, the user may practice dissecting down into the pelvic region to extract the simulated mesorectum 262. FIG. 24 illustrates an approximate midline cross-section of a pelvic region of the model 200. The model 200 includes an anteriorly-located plastic sheet 248 that is configured to simulate the pubis bone. The plastic sheet 248 reduces the working space in which the user must practice. The anatomy above the simulated rectum 250 includes a simulated prostate system 252. The simulated prostate system 252 includes a simulated prostate 254, simulated seminal vesicles 256, simulated bladder 258, simulated urethra, and simulated vas deferens. The simulated urethra and simulated vas deferens are made of silicone formed into a solid or hollow tube. The simulated seminal vesicles 256 are made of urethane foam other foam or material over molded onto the simulated vas deferens. The simulated prostate 254 is made of urethane foam or other foam or material over molded onto the simulated urethra. The simulated prostate system 252 is connected to the plastic sheet 248 with fasteners such as rivets 226 inserted through holes 209 in the plastic sheet 248. A plastic base 260 is provided on the posterior side of the model 200. The plastic base 260 creates the confined space for practicing surgical procedures. The simulated rectum 250 includes a cylindrical shape of silicone surrounded by a simulated mesorectum layer 262. Another layer or tube 264 of silicone is provided that includes an inner layer 266 of polyfill fiber. The surgeon practices cutting through the polyfill fiber layer 266 to mobilize a portion of the simulated rectum 250. The simulated rectum 250 is connected to the base 260 with fasteners such as rivets 226 inserted into holes 209 in the plastic base 260. The rivets 226 are attached to the second layer or tube 264 to provide the user with space for entering and dissecting through the polyfill layer 266 to remove the simulated rectum 250 and simulated mesorectum 262.

International Application No. PCT/US2015/022774 entitled "Simulated dissectible tissue" filed on Mar. 26, 2015 is incorporated herein by reference in its entirety. International Application No. PCT/US2016/041852 entitled "Simulated dissectible tissue" filed on Jul. 12, 2016 is incorporated herein by reference in its entirety.

It is understood that various modifications may be made to the embodiments of the simulated dissectible tissue disclosed herein. Therefore, the above description should not be construed as limiting, but merely as exemplifications of preferred embodiments. Those skilled in the art will envision other modifications within the scope and spirit of the present disclosure.

We claim:

1. A simulated dissectible tissue structure for surgical training, comprising:
    a lower pelvis region model including:
    a first cylinder of silicone having an outer surface and an inner surface defining a first lumen;
    a second cylinder of silicone having an outer surface and an inner surface defining a second lumen;
    a third cylinder of silicone having an outer surface and an inner surface defining a third lumen;
    a fourth cylinder of polyfill located between the third cylinder and second cylinder; and
    a frame defining an interior and an exterior;
    wherein the first cylinder, second cylinder, third cylinder and fourth cylinder are suspended inside the interior of the frame; and first cylinder is located inside the second cylinder and the second cylinder is located inside the third cylinder.

2. The simulated dissectible tissue structure of claim 1 further including a simulated prostate system suspended inside the interior of the frame; the simulated prostate system comprising a simulated prostate, simulated seminal vesicles, simulated bladder, simulated urethra and simulated vas deferens.

3. The simulated dissectible tissue structure of claim 2 wherein the simulated urethra and simulated vas deferens are made of silicone formed into a solid or hollow tube.

4. The simulated dissectible tissue structure of claim 3 wherein the simulated seminal vesicles are made of urethane foam over molded onto the simulated vas deferens.

5. The simulated dissectible tissue structure of claim 3 wherein the simulated prostate is made of urethane foam over molded onto the simulated urethra.

6. The simulated dissectible tissue structure of claim 1 further including a simulated bladder suspended inside the interior of the frame.

7. The simulated dissectible tissue structure of claim 1 further including a simulated prostate suspending inside the interior of the frame.

8. The simulated dissectible tissue structure of claim 1 wherein the interior and exterior of the frame are defined by top and base panels provided respectively on anterior and posterior sides of the lower pelvis region model; the top and base panels being made of plastic and both having one or more fastener location.

9. The simulated dissectible tissue structure of claim 8 wherein the top panel which is located anteriorly is configured to simulate a pubic bone area.

10. The simulated dissectible tissue structure of claim 8 wherein a simulated prostate system is connected to the top panel via connection of one or more fastener with the one or more fastener location.

11. The simulated dissectible tissue structure of claim 8 wherein a simulated rectum is connected to the base panel via connection of one or more fastener with the one or more fastener location; the simulated rectum comprising the first cylinder, second cylinder, third cylinder and fourth cylinder, wherein the second cylinder represents a simulated mesorectum layer.

12. The simulated dissectible tissue structure of claim 11 wherein the one or more fastener is a rivet and the one or more fastener location is a hole sized and configured to receive the rivet.

13. The simulated dissectible tissue structure of claim 12 wherein the rivet is attached to the third cylinder with the fourth cylinder being located inside of the third cylinder serving as an inner layer of polyfill.

14. The simulated dissectible tissue structure of claim 10 wherein the one or more fastener is a rivet and the one or more fastener location is a hole sized and configured to receive the rivet.

* * * * *